United States Patent
Lee et al.

(10) Patent No.: US 11,544,905 B2
(45) Date of Patent: Jan. 3, 2023

(54) METHOD AND APPARATUS FOR PROVIDING VIRTUAL CLOTHING WEARING SERVICE BASED ON DEEP-LEARNING

(71) Applicant: NHN CLOUD CORPORATION, Gyeonggi-do (KR)

(72) Inventors: Hyug Jae Lee, Gyeonggi-do (KR); Rok Kyu Lee, Gyeonggi-do (KR); Min Seok Kang, Gyeonggi-do (KR); Myoung Hoon Cho, Gyeonggi-do (KR)

(73) Assignee: NHN CLOUD CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/105,599

(22) Filed: Nov. 26, 2020

(65) Prior Publication Data
US 2021/0241531 A1  Aug. 5, 2021

(30) Foreign Application Priority Data
Feb. 4, 2020  (KR) ........................ 10-2020-0013102

(51) Int. Cl.
*G06T 19/00* (2011.01)
*G06K 9/62* (2022.01)
(Continued)

(52) U.S. Cl.
CPC ............ *G06T 19/00* (2013.01); *G06K 9/6256* (2013.01); *G06K 9/6262* (2013.01); *G06N 3/08* (2013.01); *G06N 20/00* (2019.01); *G06T 3/0093* (2013.01)

(58) Field of Classification Search
CPC ....... G06T 19/00; G06T 3/0093; G06T 3/005; G06T 3/00; G06T 2210/16; G06T 19/20;
(Continued)

(56) References Cited

U.S. PATENT DOCUMENTS

2020/0380594 A1* 12/2020 Ueda ......................... G06T 7/00
2021/0118239 A1*  4/2021 Santesteban ....... G06Q 30/0643
(Continued)

FOREIGN PATENT DOCUMENTS

| KR | 10-2011-0112130 | 10/2011 |
| KR | 10-2013-0052159 | 5/2013 |
| KR | 10-2019-0119212 | 10/2019 |

OTHER PUBLICATIONS

Wang et al.: "Toward Characteristic-Preserving Image-based Virtual Try-on Network". In proceedings of the European Conference on Computer Vision, 2018, pp. 589-604.
(Continued)

*Primary Examiner* — Xilin Guo
(74) *Attorney, Agent, or Firm* — Ladas & Parry, LLP

(57) ABSTRACT

A method and apparatus provide a virtual clothing wearing service based on deep-learning. A virtual clothing wearing server based on deep-learning includes a communicator configured to receive a user image and a v clothing image; a memory configured to store a program including first and second deep-learning models; a processor configured to generate an image of virtually dressing a virtual wearing clothing on a user. The program is configured to: generate, by the first deep-learning model, a transformed virtual wearing clothing image by transforming the virtual wearing clothing image in accordance with a body of the user in the user image based on the user image and the virtual wearing clothing image, and generate, by the second deep-learning model, the virtual wearing person image by dressing the transformed virtual wearing clothing on the body of the user based on the user image and the transformed virtual wearing clothing image.

17 Claims, 13 Drawing Sheets

(51) Int. Cl.
*G06N 20/00* (2019.01)
*G06T 3/00* (2006.01)
*G06N 3/08* (2006.01)

(58) Field of Classification Search
CPC ....... G06T 11/60; G06T 3/4046; G06T 11/00; G06T 7/11; G06T 2207/2008; G06K 9/6256; G06K 9/6262; G06K 9/6271; G06K 9/00362; G06K 9/62; G06K 9/6267; G06N 20/00; G06N 3/08; G06N 3/0454; G06N 3/0472; G06Q 30/0643; G06Q 30/00; G06V 40/10; G06V 10/82
See application file for complete search history.

(56) References Cited

U.S. PATENT DOCUMENTS

2021/0133919 A1* 5/2021 Ayush .................. G06T 3/0093
2021/0142539 A1* 5/2021 Ayush .................. G06T 3/0093

OTHER PUBLICATIONS

Office Action dated Apr. 7, 2021 for Korean Patent Application No. 10-2020-0013102 and its English machine translation from Global Dossier.

\* cited by examiner

FIG. 20

```
LEARNING OF A SECOND-1 DEEP-LEARNING
MODEL AND A SECOND-2 DEEP-LEARNING MODEL          — S310
```

FIG. 21

```
GENERATE A FIRST-1 TRANSFORMATION
VIRTUAL WEARING CLOTHING IMAGE BY
PERFORMING PERSPECTIVE
TRANSFORMATION OF VIRTUAL WEARING                 — S510
CLOTHING IN ACCORDANCE WITH
A DIRECTION OF A BODY OF A USER
              │
              ▼
GENERATING A FIRST-2 TRANSFORMATION
VIRTUAL WEARING CLOTHING IMAGE WHICH IS
A FINALLY TRANSFORMED VIRTUAL WEARING
CLOTHING BY TRANSFORMING IN DETAIL OF             — S520
THE FIRST-1 TRANSFORMATION VIRTUAL
WEARING CLOTHING IMAGE IN ACCORDANCE
WITH A DETAILED SHAPE OF THE BOD OF THE USER
```

FIG. 22

```
GENERATE A SYNTHESIS MASK IMAGE AND AN
AN INTERMEDIATE PERSON IMAGE                      — S610
              │
              ▼
GENERATE THE FIRST VIRTUAL WEARING PERSON
IMAGE BY SYNTHESIZING THE FIRST-2
TRANSFORMATION VIRTUAL WEARING CLOTHING           — S620
IMAGE, THE INTERMEDIATE PERSON
IMAGE AND THE SYNTHESIS MASK IMAGE
              │
              ▼
GENERATE THE SECOND VIRTUAL WEARING PERSON
IMAGE USING THE USER IMAGE AND THE FIRST          — S630
VIRTUAL WEARING PERSON IMAGE
```

METHOD AND APPARATUS FOR PROVIDING VIRTUAL CLOTHING WEARING SERVICE BASED ON DEEP-LEARNING

CROSS REFERENCE TO RELATED APPLICATION

This application claims priority from and benefits of Korean Patent Application No. 10-2020-0013102, filed on Feb. 4, 2020, which are hereby incorporated by reference for all purposes as if fully set forth herein.

BACKGROUND OF THE DISCLOSURE

Technical Field

The present disclosure generally relates to a method and apparatus for providing a virtual clothing wearing service based on deep-learning, and more particularly, to a method and apparatus for providing an appearance or shape of dressing image clothing on an image user virtually by using deep-learning neural network or providing a virtual clothing wearing service for virtually dressing a clothing image on an user image by using deep-learning neural network.

Related Art

As the use of a user terminal such as a smart phone, a tablet PC, a Personal Data Assistant (PDA) and a laptop computer and the development of information processing technology, it has been vigorously progressing the research for image editing technique for photographing or capturing an image or a video using the user terminal and editing the image or video in accordance with a need of the user. One of the fields that uses the image editing commercially is the field of virtual clothing wearing services that a user virtually dresses clothing displayed in an on-line shopping mall.

When shopping clothing, it is one of necessary steps to try on the clothing and identify that the clothing are fit to the user. Likewise, the user may identify that the clothing are fit to the user by just checking the clothing dressed on a model. If it is available to try on clothing of an image shown in an on-line shopping mall, a new application program may be produced in the fashion business field. A customer may check that clothing are fit without caring about a seller by using the virtual clothing wearing system, and accordingly, make good buying decisions by saving a travel time and a travel cost for shopping. As an increase of customers undergoing more realistic experience, the interest for the virtual clothing wearing system is naturally increased.

In addition, with the wide supply of the image-to-image networks and the Generative Adversarial Networks (GANs), the research for the virtual wearing system has been increased. One of the most successful architectures recently developed is CT-VTON. However, there is a problem that a generated final virtual wearing image is blur and distorted, and generated as an artificial output, and therefore, purchasing power is deteriorated. A successful virtual clothing wearing system needs to maintain the unique properties of the clothing without a damage or distortion of the clothing.

(Non-Patent document 1) B. Wang, H. Zheng, X. Liang, Y. Chen, and L. Lin. Toward characteristic-preserving image-based virtual try-on network. In Proceedings of the European Conference on Computer Vision, pages 589-604, 2018

SUMMARY

An aspect of the present disclosure provides a method and apparatus for providing virtual clothing wearing service based on deep-learning. More particularly, various exemplary embodiments of the present disclosure may provide a method and apparatus for providing an appearance or shape of virtually dressing a clothing image on an image user by using deep-learning neural network or providing a virtual clothing wearing service for virtually dressing a clothing image on a user image by using deep-learning neural network.

Particularly, certain exemplary embodiments of the present disclosure may provide a method and apparatus for providing virtual clothing wearing service based on deep-learning that may virtually dress a cloth included in a clothing image on a body of a user included in a user image.

Furthermore, some exemplary embodiments of the present disclosure may provide a method and apparatus for providing virtual clothing wearing service based on deep-learning that may virtually dress a cloth included in a clothing image on a posture of a user included in a user image.

Furthermore, certain exemplary embodiments of the present disclosure may provide a method and apparatus for providing virtual clothing wearing service based on deep-learning that may virtually dress a clothing image on a user image while maintaining unique properties of the clothing such as a design, a pattern, a printing of the clothing.

Furthermore, some exemplary embodiments of the present disclosure may provide a method and apparatus for providing virtual clothing wearing service based on deep-learning that learning is easily performed even in the case that clothing is similar to a background of an image.

Furthermore, certain exemplary embodiments of the present disclosure may provide a method and apparatus for providing virtual clothing wearing service based on deep-learning that may dress clothing even in the case that the clothing is blocked by hair or body of a user.

According an aspect of the present disclosure, virtual clothing wearing server based on deep-learning includes a communication processor configured to receive a user image and a virtual wearing clothing image; a memory configured to store at least one program including a first deep-learning model and a second deep-learning model; a processor configured to generate an image of virtually dressing the virtual wearing clothing on the user using a virtual clothing wearing deep-learning modeling unit, wherein the at least one program is configured to: generate, by the first deep-learning model, a transformed virtual wearing clothing image by transforming the virtual wearing clothing image in accordance with a body of the user in the user image based on the user image and the virtual wearing clothing image, and generate, by the second deep-learning model, the virtual wearing person image by dressing the transformed virtual wearing clothing on the body of the user based on the user image and the transformed virtual wearing clothing image.

In addition, the first deep-learning model includes a first-1 deep-learning model and a first-2 deep-learning model, the first-1 deep-learning model generates a first-1 transformation virtual wearing clothing image by performing Perspective Transformation of the virtual wearing clothing to match with a direction of the body of the user based on the user image and the virtual wearing clothing image, and the first-2 deep-learning model generates a first-2 transformation virtual wearing clothing image by transforming in detail of the first-1 transformation virtual wearing clothing to be matched with a shape of the body of the user based on the first-1 transformation virtual wearing clothing image and the user image.

In addition, the second deep-learning model includes a second-1 deep-learning model, the second-1 deep-learning model generates a synthesis mask image and an intermediate person image based on the first-2 transformation virtual wearing clothing image and the user image, and the second deep-learning model generates a first virtual wearing person image by synthesizing the synthesis mask image, the intermediate person image and the first-2 transformation virtual wearing clothing image.

In addition, the synthesis mask image is an image on which a position in which the first-2 transformation virtual wearing clothing is territorialized on the user image, and the intermediate person image is an image of generating an arm or a hand which is the body of the user in accordance with a length of the first-2 transformation virtual wearing clothing.

In addition, the second deep-learning model further includes a second-2 deep-learning model, and the second-2 deep-learning model generates a second virtual wearing person image of which image quality is improved through a plurality of dilated convolutions and based on the user image and the first virtual wearing person image.

In addition, the communication processor receives a training data set including a person, virtual wearing clothing, a transformation clothing truth image when wearing and Truth Label for a person dressing the virtual wearing clothing.

In addition, the program is configured to: perform training of the first-1 deep-learning model using a first-1 model loss of comparing the first-1 transformation virtual wearing clothing image generated by the first-1 deep-learning model and a transformation clothing truth image when virtually wearing for the person and the virtual wearing clothing of the training data set, and perform training of the first deep-learning model using a first-2 model loss of comparing the first-2 transformation virtual wearing clothing image generated by the first-2 deep-learning model and the transformation clothing truth image when virtually wearing for the person and the virtual wearing clothing of the training data set, when the first-1 deep-learning model is trained.

In addition, the program performs training the first deep-learning model using a grid interval consistency loss based on a distance between pixels of the virtual wearing clothing image.

In addition, the program generates an occlusion clothing image on which an occlusion part is removed from the transformation clothing truth image through an occlusion process, and the first deep-learning model uses the occlusion clothing image when training using the first-2 model loss.

In addition, the program is configured to: generate a first discrimination image based on the first-2 transformation virtual wearing clothing image, and perform training the first deep-learning model using a first adversarial loss based on the first discrimination image.

In addition, the program generates a second virtual wearing person image by the second-2 deep-learning model using the first-2 transformation virtual wearing clothing image generated by the first-2 deep-learning model for the person and the virtual wearing clothing of the training data set.

In addition, the program performs training the second deep-learning model using the second model loss for comparing the second virtual wearing person image for the person and the virtual wearing clothing of the training data set and a truth label for the person dressing the virtual wearing clothing.

In addition, the memory further includes VGG-19 neural network, and the program generates a layer property map for the second virtual wearing person image for the person and the virtual wearing clothing of the training data set and a layer property map for the truth label for the person dressing the virtual wearing clothing.

In addition, the program performs training the second deep-learning model using a perceptual loss for comparing the layer property map for the second virtual wearing person image for the person and the virtual wearing clothing of the training data set and the layer property map for the truth label for the person dressing the virtual wearing clothing.

In addition, the program is configured to: generate a second discrimination image based on the second virtual wearing person image through the second deep-learning model, and perform training using a second adversarial loss based on the second discrimination image.

According another aspect of the present disclosure, a terminal includes a communication processor configured to transmit a user image and a virtual wearing clothing image; at least one processor configured to provide a virtual wearing image of dressing the virtual wearing clothing to the user using a virtual clothing wearing service request program; and a memory configured to store the virtual clothing wearing service request program executed by the at least one processor, wherein the virtual clothing wearing service request program is configured to: select the user image and the virtual wearing clothing image, transmit the selected user image and the virtual wearing clothing image using the communication processor, and receive a virtual wearing person image generated by a virtual clothing wearing server based on deep-learning, wherein the virtual clothing wearing server based on deep-learning includes a program including a first deep-learning model and a second deep-learning model, wherein the first deep-learning model generates a transformed virtual wearing clothing image by transforming the virtual wearing clothing in accordance with a body of the user, and wherein the second deep-learning model generates the virtual wearing person image by dressing the transformed virtual wearing clothing on the body of the user.

According another aspect of the present disclosure, method for providing a virtual clothing wearing service based on deep-learning for providing an image of virtually dressing clothing by matching the clothing to a body of a user in a processor of a virtual clothing wearing server based on deep-learning includes obtaining a user image and a virtual wearing clothing image; inputting the user image and the virtual wearing clothing image to a first deep-learning model; outputting a virtual wearing clothing image for the virtual wearing clothing is transformed in accordance with a body of the user in the first deep-learning model; inputting, by a second deep-learning model, the user image and the transformed virtual wearing clothing image to the second deep-learning model; and outputting a virtual wearing person image by dressing the transformed virtual wearing clothing on the body of the user in the second deep-learning model.

In addition, the step of outputting a virtual wearing clothing image for the virtual wearing clothing is transformed in accordance with a body of the user in the first deep-learning model includes: generating a first-1 transformation virtual wearing clothing image by performing Perspective Transformation of the virtual wearing clothing to match with a direction of the body of the user based on the user image and the virtual wearing clothing image.

In addition, the step of outputting a virtual wearing clothing image for the virtual wearing clothing is transformed in accordance with a body of the user in the first deep-learning model further includes: generating a first-2 transformation virtual wearing clothing image by transforming in detail of the first-1 transformation virtual wearing clothing to be matched with a shape of the body of the user based on the first-1 transformation virtual wearing clothing image and the user image.

In addition, the method further includes transmitting the outputted virtual wearing person image to a terminal of the user.

ADVANTAGEOUS EFFECTS

A method and apparatus for providing virtual clothing wearing service based on deep-learning according to an embodiment may provide an appearance or shape of virtually wearing a cloth of a clothing image on a user of a user image by using deep-learning neural network.

Furthermore, a method and apparatus for providing virtual clothing wearing service based on deep-learning according to an embodiment may virtually dress a cloth of a clothing image on a body of a user image.

Furthermore, some exemplary embodiments of the present disclosure providing a method and apparatus for providing virtual clothing wearing service based on deep-learning may dress a cloth of a clothing image on a posture of a user image.

Furthermore, certain exemplary embodiments of the present disclosure providing a method and apparatus for providing virtual clothing wearing service based on deep-learning may dress a cloth of a clothing image on a user of a user image while maintaining unique properties of the clothing such as a design, a pattern, a printing of the clothing.

Furthermore, according to some exemplary embodiments of the present disclosure providing a method and apparatus for providing virtual clothing wearing service based on deep-learning, learning is easily performed even in the case that clothing is similar to a background of an image.

Furthermore, certain exemplary embodiments of the present disclosure providing a method and apparatus for providing virtual clothing wearing service based on deep-learning may dress clothing even in the case that the clothing is blocked by hair or body of a user.

BRIEF DESCRIPTION OF THE DRAWINGS

FIG. 20 is a flowchart for illustrating a method for learning a second deep-learning model of FIG. 18.

FIG. 21 is a flowchart for illustrating a method for generating the virtual wearing clothing of which the first deep-learning model is transformed.

FIG. 22 is a flowchart for illustrating a method for generating the virtual wearing clothing of which the second deep-learning model is transformed.

DESCRIPTION OF EXEMPLARY EMBODIMENTS

Figure 1:
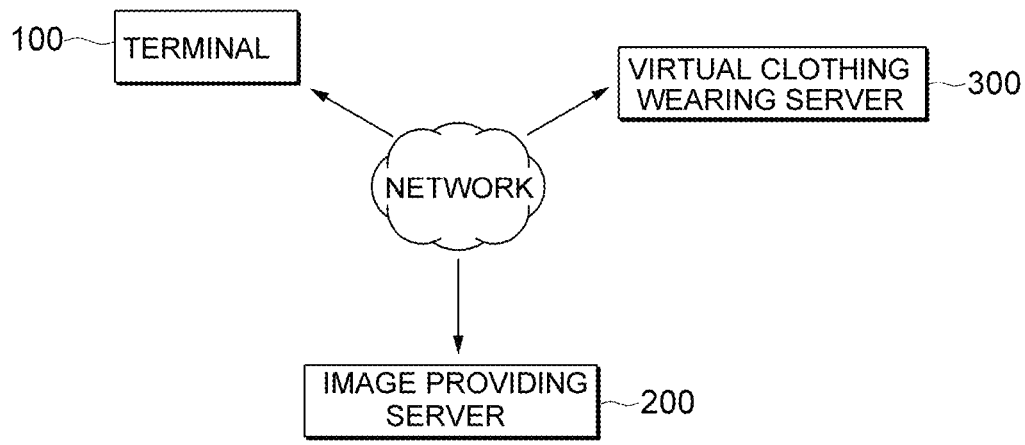
FIG. 1 is a conceptual diagram for a system for a virtual clothing wearing service based on deep-learning according to an embodiment of the present disclosure.

The present disclosure may have various modifications and various embodiments, and specific embodiments will be illustrated in the drawings and described in detail in the detailed description. The technical effect and feature of the present disclosure and the method for attain it become clear by referring to the embodiments described below together with the drawings. However, the present disclosure may not be limited to the embodiments disclosed below but may be implemented in various forms. In the following embodiments, the terms "first" and "second" are used to distinguish one element from another element, and the scope of the present disclosure should not be limited by these terms. In addition, a singular expression should be interpreted that the singular expression includes a plural expression unless it does not mean otherwise in the context. Furthermore, the term "include" or "have" indicates that a feature or a component described in the specification is present but does not exclude a possibility of presence or addition of one or more other features or components in advance. In addition, for the convenience of description, sizes of components are enlarged or reduced in the drawings. For example, a size and a thickness of each component shown in the drawings arbitrarily for the convenience of description, and the present disclosure is not limited thereto.

Hereinafter, preferred embodiments of the present disclosure will be described in detail with reference to the accompanying drawings and in describing the preferred embodiments with reference to the accompanying drawings, the same reference numeral will refer to the same or corresponding component regardless of the reference numeral and a duplicated description thereof will be omitted.

Figure 2:
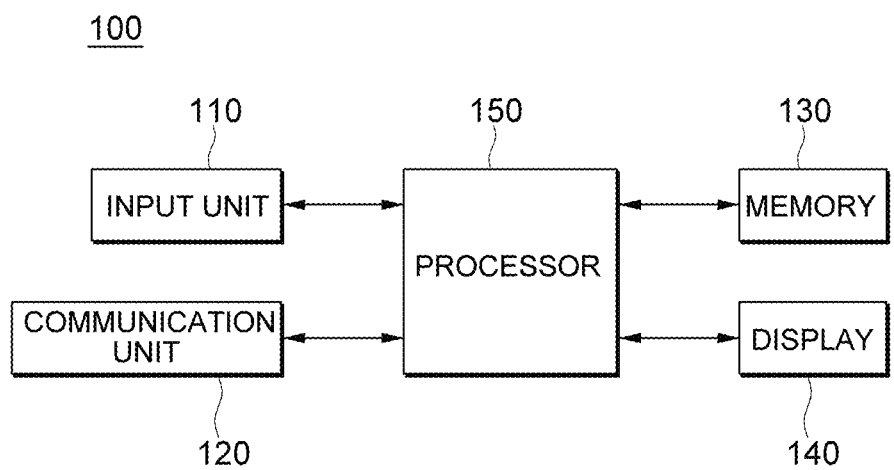
FIG. 2 is an internal block diagram for a user terminal for executing an application for a virtual clothing wearing service based on deep-learning according to an embodiment of the present disclosure.
Figure 3:
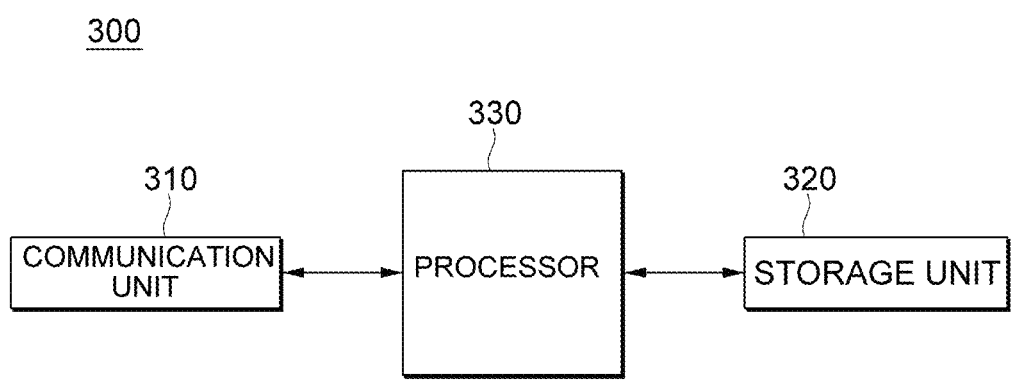
FIG. 3 is an internal block diagram for a virtual clothing wearing server for executing an application having a virtual clothing wearing service function based on deep-learning according to an embodiment of the present disclosure.
Figure 4:
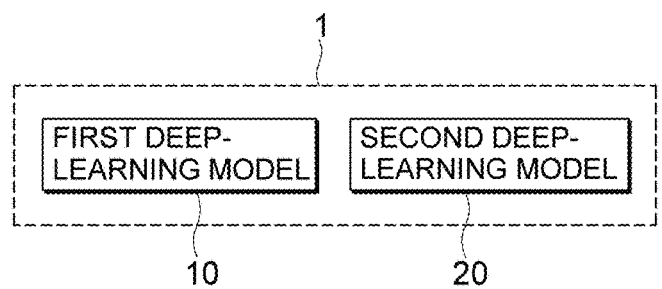
FIG. 4 is a diagram for illustrating a structure of a virtual clothing wearing deep-learning modeling unit according to an embodiment of the present disclosure.

FIG. 1 is a conceptual diagram for illustrating a system for a virtual clothing wearing service based on deep-learning according to an embodiment of the present disclosure, and FIG. 2 is an internal block diagram for a user terminal for executing an application for a virtual clothing wearing service based on deep-learning according to an embodiment of the present disclosure. FIG. 3 is an internal block diagram for a virtual clothing wearing server for executing an application having a virtual clothing wearing service function based on deep-learning according to an embodiment of the present disclosure, and FIG. 4 is a diagram for illustrating a structure of a virtual clothing wearing deep-learning modeling unit according to an embodiment of the present disclosure.

Referring to FIG. 1, a virtual clothing wearing service system according to an embodiment may include a terminal 100, an image providing server 200 and a virtual clothing wearing server 300.

Each of the elements shown in FIG. 1 may be connected with each over through a network. The network may mean a connection structure available to data, signal and information exchange among the nodes such as the terminal 100, the image providing server 200 and the virtual clothing wearing server 300. An example of the network may include 3GPP (3rd Generation Partnership Project) network, LTE (Long Term Evolution) network, WIMAX (World Interoperability for Microwave Access) network, Internet, LAN (Local Area Network), Wireless LAN (Wireless Local Area Network), WAN (Wide Area Network), PAN (Personal Area Network), Bluetooth network, Satellite broadcasting network, Analogue broadcasting network, DMB (Digital Multimedia Broadcasting), and the like, but not limited thereto.

<Terminal 100>

First, the terminal 100 is a terminal of a user intended to receive a virtual clothing wearing service. For example, the terminal 100 may be configured to provide a user interface for the virtual clothing wearing service through an application, web and program. In addition, the terminal 100 may be provided with a function of virtually dressing clothing by accessing to the virtual clothing wearing server 300 through wired or wireless communication. However, the present disclosure is not limited thereto, and in the case that the virtual clothing wearing server 300 is embedded in the terminal 100, the terminal 100 may provide the function of virtually dressing clothing.

The terminal 100 is not limited to a specific terminal so long as executing an application for requesting the function of virtually dressing clothing. For example, the terminal 100 may include a smart phone, a mobile telephone, a laptop computer, a terminal for digital broadcasting, a personal digital assistant (PDA), a portable multimedia player (PMP), a navigation, a tablet PC, an ultrabook, a wearable device, a glass type terminal (smart glass) or a kiosk.

The terminal 100 may include a processor for processing data and a memory in which a program for virtual clothing wearing service request is installed. The processor of the terminal 100 may read out the virtual clothing wearing service request program and may be provided with one or more image of virtually dressing clothing from the virtual clothing wearing server 300.

Particularly, a user may execute the virtual clothing wearing service request program on the terminal 100, select a user image and a virtual wearing clothing image, transmit the selected user image and the selected virtual wearing clothing image to the virtual clothing wearing server 300, and obtain a user image of dressing the virtual clothing from the virtual clothing wearing server 300.

Internal Components of the Terminal 100

Hereinafter, a detailed configuration of the terminal is described in detail with reference to FIG. 2.

The terminal 100 according to an embodiment may include an input unit 110, a display 140, a communication unit 120, a memory 130 and a processor 150.

First, the terminal 100 may include the input unit 110 for detecting or receiving a user input. For example, the input unit 110 may detect or receive an execution input of turning on/off power or configuration, execution input, and the like for various functions of the terminal 100.

The input unit 110 may include at least one of a touch input device (e.g., a touch sensor, a touch key, a mechanical key, etc.) for detecting a user touch and a microphone for detecting a voice input, and accordingly, may receive or detect a user input.

In addition, the terminal 100 may include the display 140 for displaying a process screen or user interface of the virtual clothing wearing service function. The display 140 may be formed with a multi-layer structure with a touch sensor or integrally formed, and accordingly, may be implemented with a touch screen. The touch screen may function as the user input 110 that provides an input interface between the terminal 100 and a user, and simultaneously, may provide an output interface between the terminal 100 and the user.

The display 140 may include at least one of a liquid crystal display (LCD), a thin film transistor-liquid crystal display (TFT LCD), an organic light-emitting diode (OLED), a flexible display, a 3D display and an e-ink display.

The user may select clothing to wear through the touch screen and check a user image of dressing the clothing as selected.

Furthermore, the terminal 100 may include the communication unit 120 for wirelessly or wired communicating with the virtual clothing wearing server 300.

Particularly, the terminal 100 may transmit the user image and the virtual wearing clothing image to the virtual clothing wearing server 300 through the communication unit 120. The terminal 100 may receive the user image of dressing the virtual wearing clothing which is transformed in accordance with the body of the user from the virtual clothing wearing server 300 through the communication unit 120.

Particularly, the communication unit 120 may transmit and receive a wireless signal to and from at least one of a base station, an external terminal and a server on a network constructed based on the following communication scheme (e.g., GSM (Global System for Mobile communication), CDMA (Code Division Multi Access), HSDPA (High Speed Downlink Packet Access), HSUPA (High Speed Uplink Packet Access), LTE (Long Term Evolution), LTE-A (Long Term Evolution-Advanced), WLAN (Wireless LAN), Wi-Fi (Wireless-Fidelity), Wi-Fi (Wireless Fidelity) Direct, DLNA (Digital Living Network Alliance), WiBro (Wireless Broadband) and WiMAX (World Interoperability for Microwave Access).

The memory 130 may store a plurality of application programs or application operating in the terminal 100, data for operating the terminal 100 and commands.

Particularly, the virtual clothing wearing service request program may be stored in the memory 130 and installed on the terminal 100, and accordingly, may be executed to perform an operation (or function) of the terminal 100 by the processor 150.

Furthermore, the memory 101 may be various types of storage device such as ROM, RAM, EPROM, flash drive, hard drive, and the like as hardware, and the memory 130 may be a web storage that performs a storage function of the memory 130 on internet.

Lastly, the processor 150 may be included in the terminal 100 and configured to control the overall operations of the units of the terminal and perform a data processing for providing the virtual clothing wearing request.

The processor 150 may be ASICs (application specific integrated circuits), DSPs (digital signal processors), DSPDs (digital signal processing devices), PLDs (programmable logic devices), FPGAs (field programmable gate arrays), controllers, micro-controllers, microprocessors, or other processors of arbitrary shapes for performing functions.

<Image Providing Server 200>

The image providing server 200 may be a server for providing images and provide a training data set to the virtual clothing wearing server 300. More particularly, the training data set may include Ground Truth Labels for a person, a virtual wearing clothing, a transformation clothing truth image when wearing, and the person dressing the virtual wearing clothing. In one example, the image providing server 200 may store the training data set for enormous and various types of people and virtual wearing clothing previously released.

The image providing server 200 may include a communication module configured to communicate with the terminal 100, a data processor configured to process data and a database storing various types of data.

<Virtual Clothing Wearing Server 300>

The virtual clothing wearing server 300 may include a separate cloud server and/or a computing device. Furthermore, the virtual clothing wearing server 300 may be a neural network system installed in the processor of the terminal 100 or the data processor of the image providing server 200 and combination thereof. Hereinafter, it is described that the virtual clothing wearing server 300 is a separate device from the terminal 100 or the image providing server 200 for illustration purposes only.

Referring to FIG. 3, the virtual clothing wearing server 300 may receive a user image and a virtual wearing clothing image from the terminal 100 through a communication module 310 and receive a training data set from the image providing server 200.

The virtual clothing wearing server 300 may construct a virtual clothing wearing deep-learning model using the training data set, and dress clothing on a user virtually. Accordingly, the present disclosure may provide a shape of dressing image clothing virtually on an image user by using deep-learning neural network. More particularly, referring to FIGS. 3 and 4, the virtual clothing wearing server 300 may include a virtual clothing wearing deep-learning modeling unit 1. The virtual clothing wearing deep-learning modeling unit 1 of the virtual clothing wearing server 300 may include a first deep-learning model 10 and a second deep-learning model 20. The virtual clothing wearing deep-learning modeling unit 1 may transform virtual wearing clothing in accordance with a body of a user using the first deep-learning model 10, and dress the transformed virtual wearing clothing on the user using the second deep-learning model 20. The detailed description for the virtual clothing wearing server 300 that trains the first deep-learning model 10 and the second deep-learning model 20 and dresses clothing on the user virtually using the trained first deep-learning model 10 and second deep-learning model 20 will be described below.

In addition, the virtual clothing wearing server 300 may include a processor 330 configured to process data and a storage unit 320 configured to store the virtual clothing wearing deep-learning modeling unit 1. The processor 330 reads out the virtual clothing wearing deep-learning modeling unit 1 and performs virtual clothing wearing deep-learning for a user and virtual wearing clothing described below according to the constructed neural network system.

According to an embodiment, the processor 330 may include a main processor for controlling entire units of the virtual clothing wearing server 300 and a plurality of Graphics Processing Units (GPUs) for processing large amount of operations required for driving neural network of the virtual clothing wearing deep-learning modeling unit.

Figure 5:
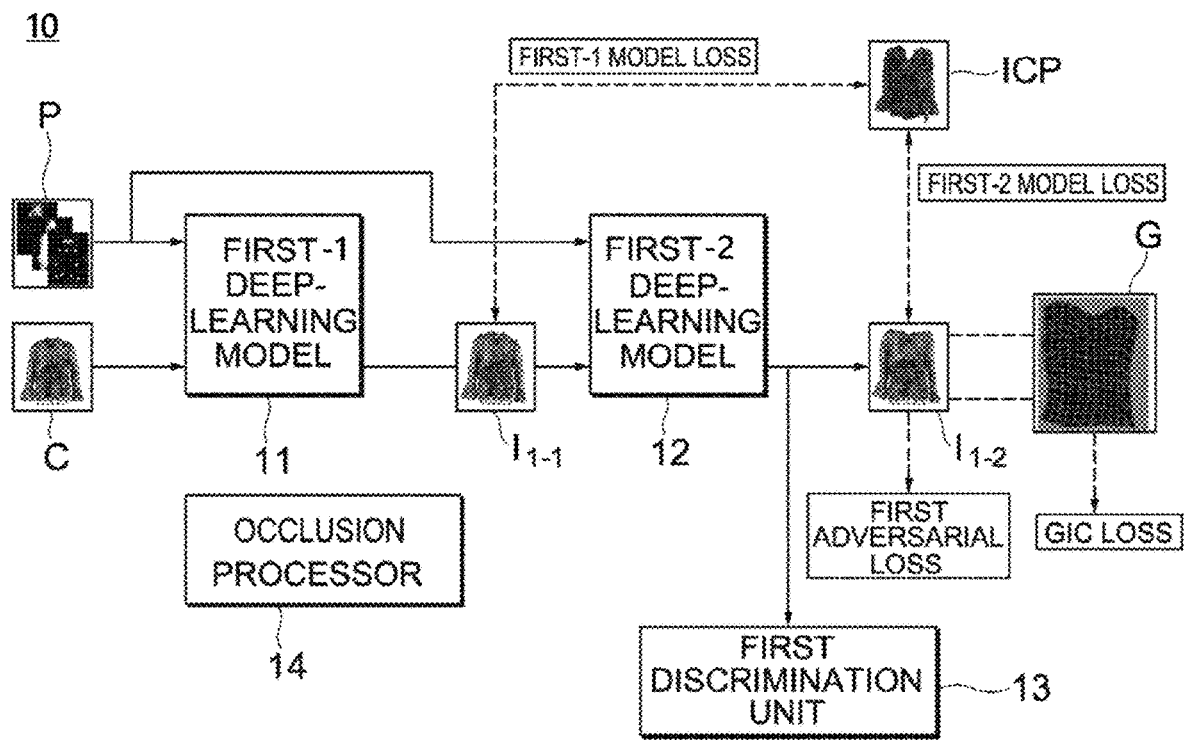
FIG. 5 is a diagram for schematically describing a structure of a first deep-learning model of a virtual clothing wearing deep-learning modeling unit according to an embodiment of the present disclosure.
Figure 6:
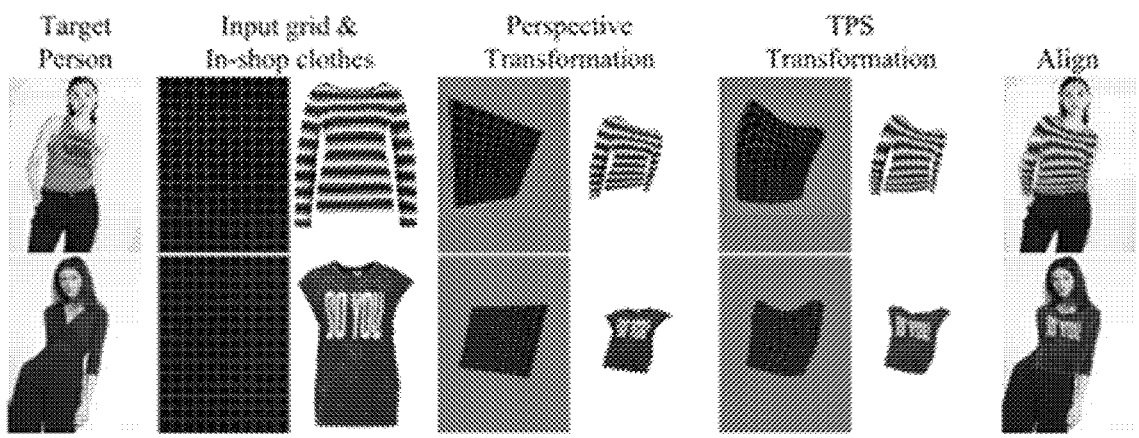
FIG. 6 illustrates experimental examples showing a shape of transforming a virtual wearing clothing in perspective and a shape of being transformed in detail by the first deep-learning model according to an embodiment of the present disclosure.
Figure 7:
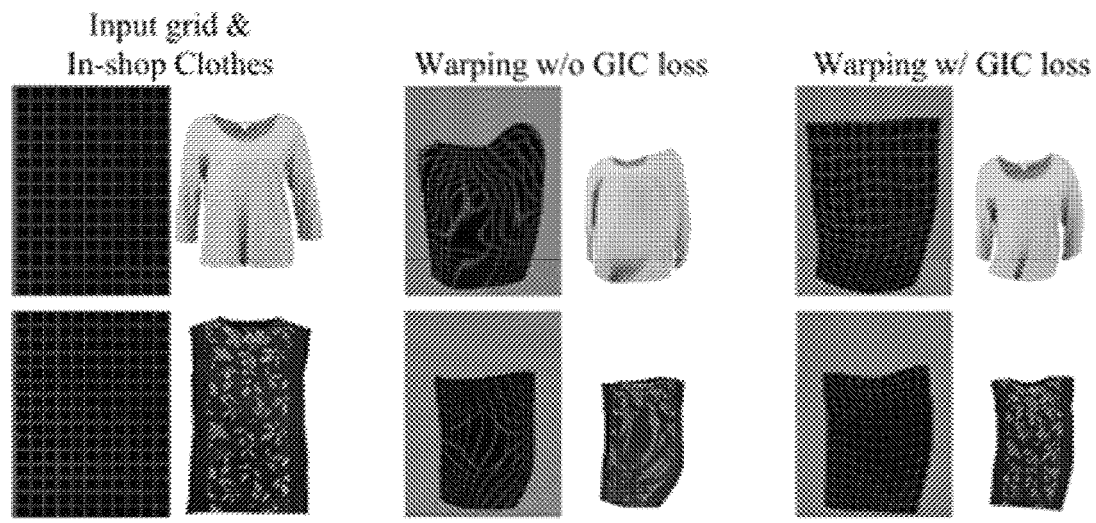
FIG. 7 illustrates experimental examples showing a shape of transformation result to which a grid interval consistency loss is not applied and a shape of transformation result to which a grid interval consistency loss is applied by a first deep-learning model according to an embodiment of the present disclosure.
Figure 8:
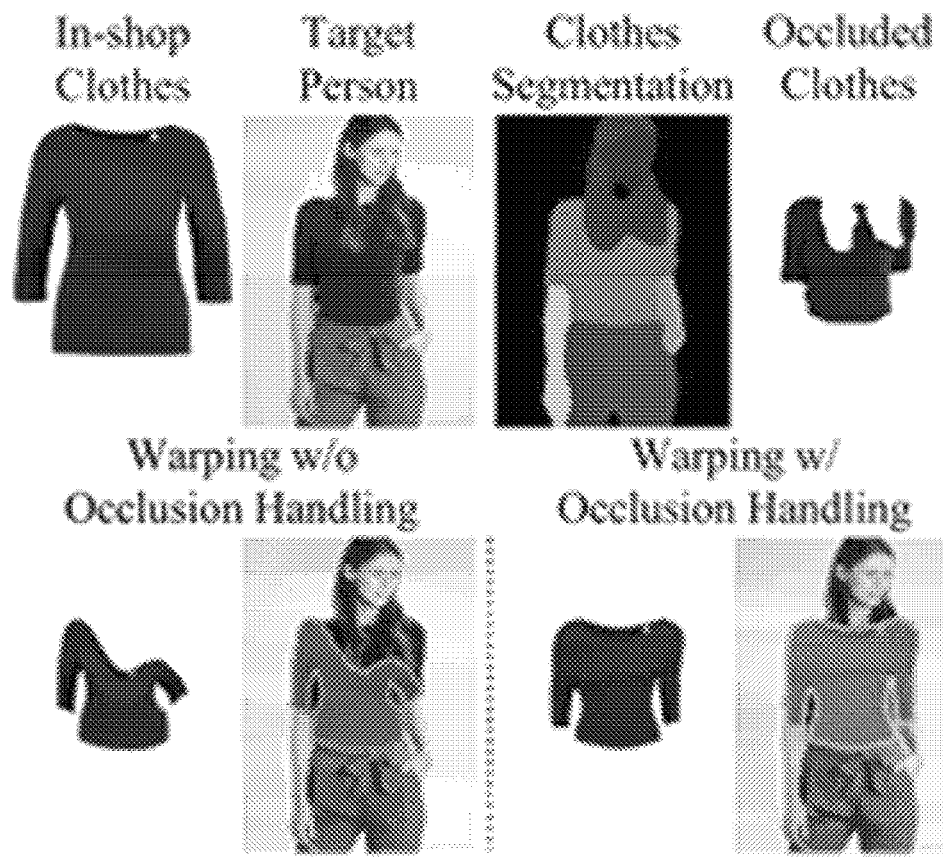
FIG. 8 illustrates experimental examples of a occlusion processing method of a first deep-learning model, and showing a shape of transformation result to which a occlusion processing is not applied and a shape of transformation result to which a occlusion processing is applied according to an embodiment of the present disclosure.
Figure 9:
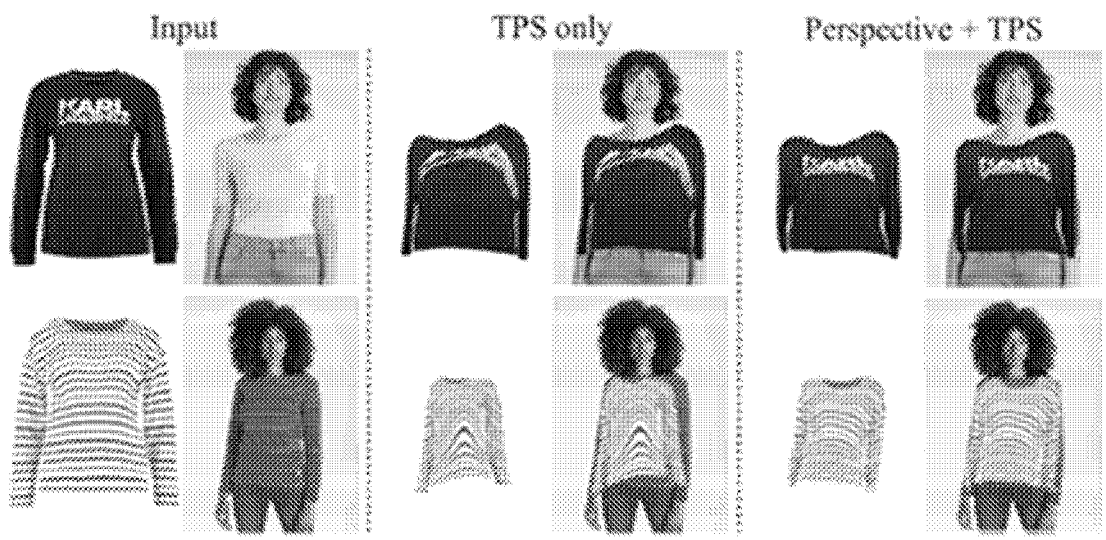
FIG. 9 illustrates experimental examples for showing an effect according to a sequential transformation of a first-1 deep-learning model and a first-2 deep-learning model in a first deep-learning model according to an embodiment of the present disclosure.
Figure 10:
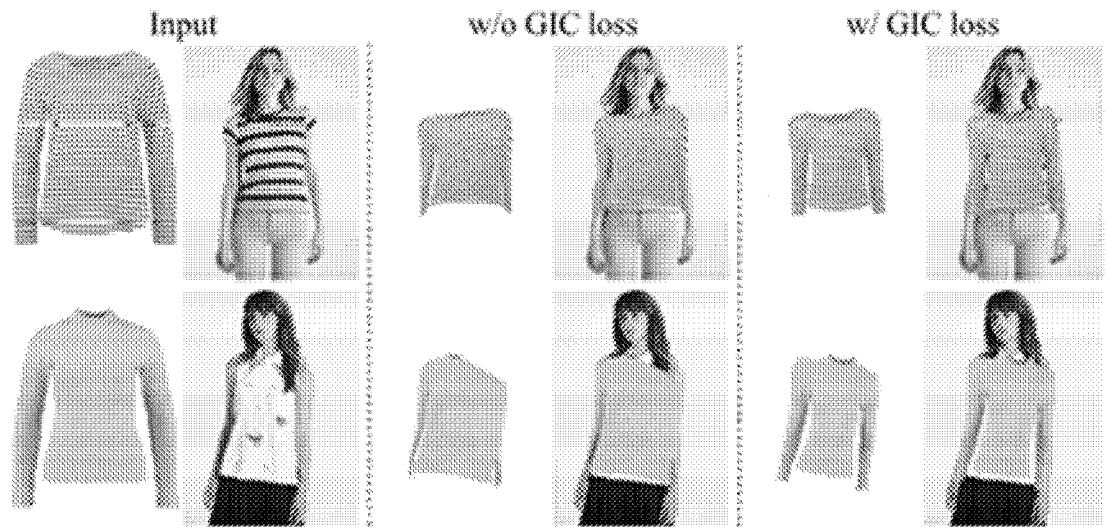
FIG. 10 illustrates experimental examples for showing an effect according to an application of a grid interval consistency loss in a first deep-learning model according to an embodiment of the present disclosure.
Figure 11:
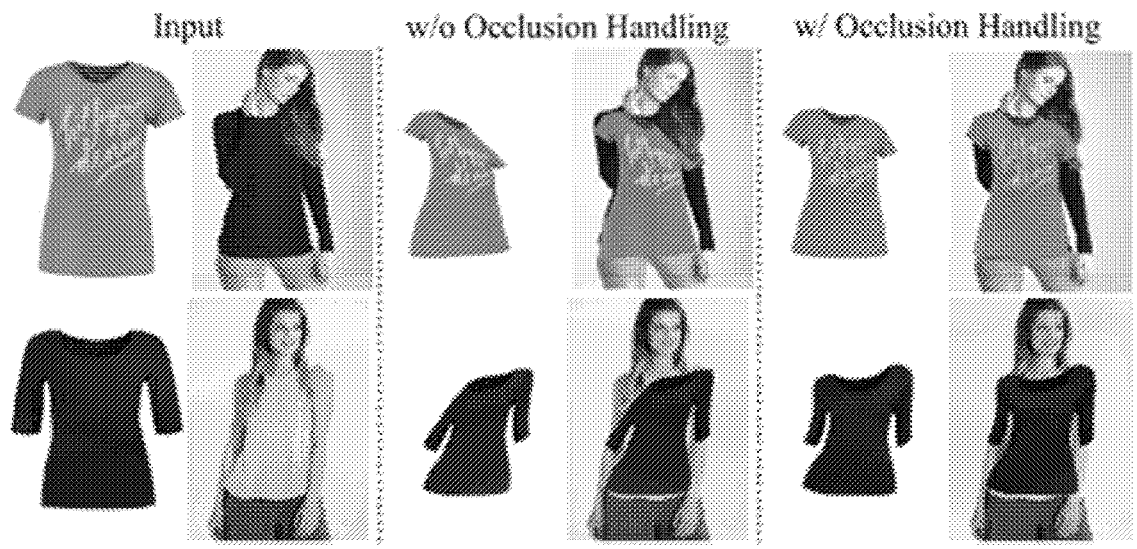
FIG. 11 illustrates experimental examples for showing an effect according to a occlusion processing in a first deep-learning model according to an embodiment of the present disclosure.
Figure 12:
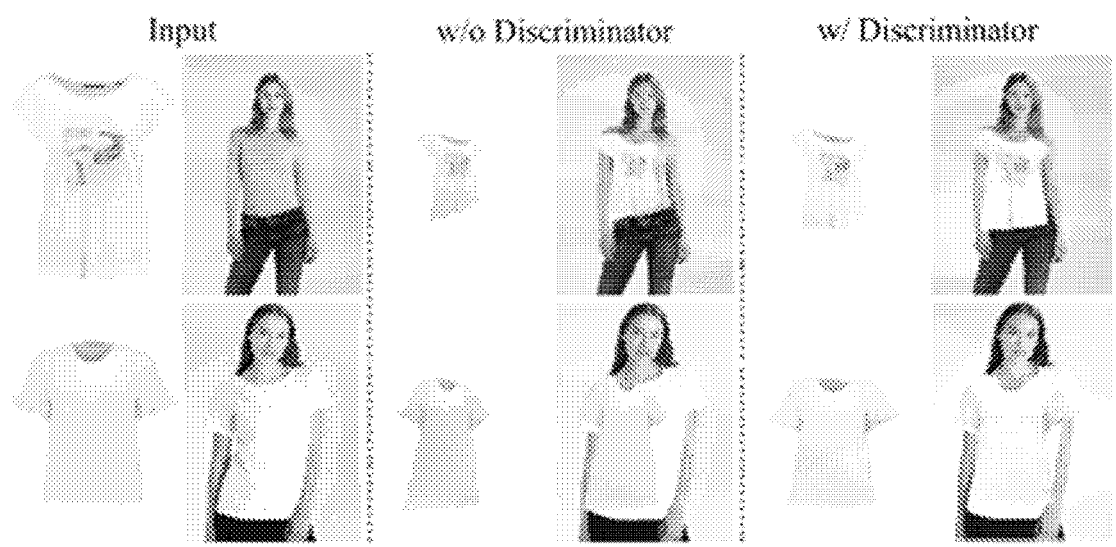
FIG. 12 illustrates experimental examples for showing an effect according to a first discrimination unit in a first deep-learning model according to an embodiment of the present disclosure.
Figure 13:
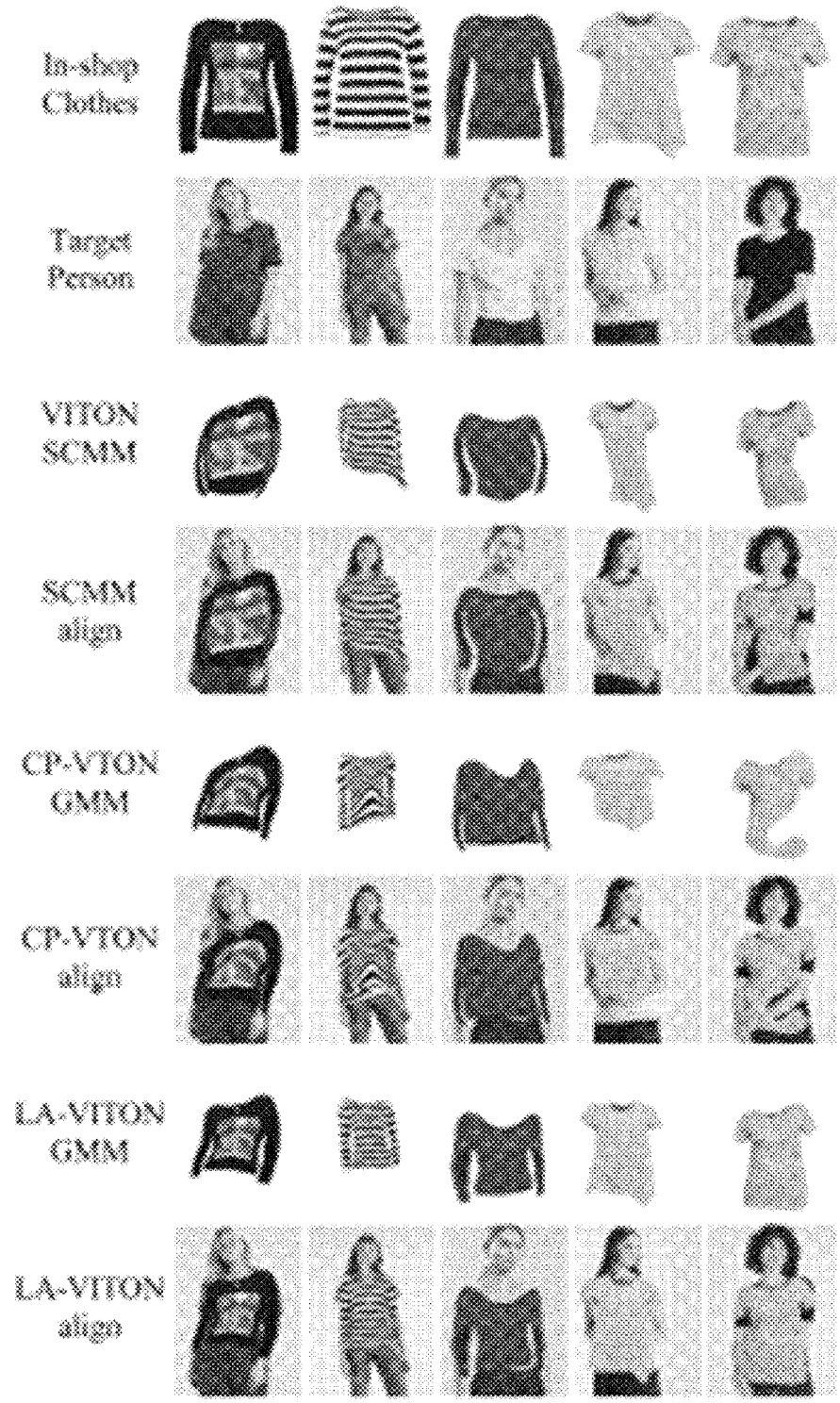
FIG. 13 illustrates comparison examples of comparing shapes of transformation result of virtual wearing clothing of a first deep-learning model according to an embodiment of the present disclosure and conventional art.

FIG. 5 is a diagram for schematically describing a structure of a first deep-learning model of a virtual clothing wearing deep-learning modeling unit according to an embodiment of the present disclosure, and FIG. 6 illustrates experimental examples showing a shape of transforming a virtual wearing clothing in perspective and a shape of being transformed in detail by the first deep-learning model according to an embodiment of the present disclosure. FIG. 7 illustrates experimental examples showing a shape of transformation result to which a grid interval consistency loss is not applied and a shape of transformation result to which a grid interval consistency loss is applied by a first deep-learning model according to an embodiment of the present disclosure, and FIG. 8 illustrates experimental examples of a occlusion processing method of a first deep-learning model, and showing a shape of transformation result to which a occlusion processing is not applied and a shape of transformation result to which a occlusion processing is applied according to an embodiment of the present disclosure. FIG. 9 illustrates experimental examples for showing an effect according to a sequential transformation of a first-1 deep-learning model and a first-2 deep-learning model in a first deep-learning model according to an embodiment of the present disclosure, and FIG. 10 illustrates experimental examples for showing an effect according to an application of a grid interval consistency loss in a first deep-learning model according to an embodiment of the present disclosure. FIG. 11 illustrates experimental examples for showing an effect according to a occlusion processing in a first deep-learning model according to an embodiment of the present disclosure, and FIG. 12 illustrates experimental examples for showing an effect according to a first discrimination unit in a first deep-learning model according to an embodiment of the present disclosure. FIG. 13 illustrates comparison examples of comparing shapes of transformation result of virtual wearing clothing of a first deep-learning model according to an embodiment of the present disclosure and conventional art.

The first deep-learning model 10 according to an embodiment of the present disclosure may transform virtual wearing clothing in accordance with a body of a user in an user image while properties of the virtual wearing clothing are maintained. Particularly, for natural and realistic transformation of the virtual wearing clothing, the first deep-learning model 10 may transform the virtual wearing clothing in perspective, and then, transform the virtual wearing clothing sequentially and in detail. Furthermore, the first deep-learning model 10 may reflect a loss function in neural network learning such that properties such as a design, a pattern, a printing of the virtual wearing clothing are not transformed but maintained, and accordingly, may obtain a result of similar properties of actual wearing clothing. In addition, the first deep-learning model 10 may correct an occurrence of abnormal transformation because the virtual wearing clothing is similar to a background during the process of learning by using the discrimination unit and the loss function. Furthermore, in the case that there is a component such as hair or body of a user on a body part of the user image on which the virtual wearing clothing is dressed in the user image, the first deep-learning model 10 may use the occlusion process and dress the virtual wearing clothing on the body of the user of the image by excluding the component.

Referring to FIG. 5, the first deep-learning model 10 according to an embodiment of the present disclosure may include a first-1 deep-learning model 11, a first-2 deep-learning model 12, a first discrimination unit 13 and an occlusion processor 14.

<Perspective Transformation of the First-1 Deep-Learning Model>

The first-1 deep-learning model 11 may generate a first-1 transformation virtual wearing clothing image $I_{1-1}$ by performing the Perspective Transformation of virtual wearing clothing of a virtual wearing clothing image C in accordance with a direction of upper body of a user of a user image P based on the user image P and the virtual wearing clothing image C. That is, the first-1 deep-learning model 11 may deform and arrange the virtual wearing clothing in accordance with a direction of a body of a user. In one example, FIG. 6 shows a user image (Target Person), a virtual wearing clothing image (In-shop clothes) and an input grid of the virtual wearing clothing image. The first-1 deep-learning model 11 may perform the Perspective Transformation of the virtual wearing clothing image (In-shop clothes) and the input grid of the virtual wearing clothing image in accordance with the user image (Target Person). In one example, the first-1 deep-learning model 11 may be configured with in-depth neural network and include a first-1 property extraction unit and a first-1 transformation parameter estimation unit. The first-1 property extraction unit may include four down sampling convolution layers of 2-stride and 4-kernel size and two convolution layers of 1-stride and 3-kernal size. The first-1 transformation parameter estimation unit may include two down sampling convolution layers of 2-stride and 4-kernel size, two convolution layers of 1-stride and 3-kernal size and a fully connected layer. The first-1 transformation parameter estimation unit may be configured to estimate total nine parameters for Perspective Transformation when a grid size (Gsize) is 5.

<Detailed Transformation of the First-2 Deep-Learning Model 12>

The first-2 deep-learning model 12 may generate a first-2 transformation virtual wearing clothing image $I_{1-2}$ by transforming in detail (Thin-Plate-Spline transformation) the perspective transformed virtual wearing clothing of the first-1 transformation virtual wearing clothing image $I_{1-1}$ in accordance with a detailed shape of the body of the user based on the first-1 transformation virtual wearing clothing image and the user image P. That is, the first-2 deep-learning model 12 may deform and arrange in detail the virtual wearing clothing deformed and arranged in accordance with the direction of the body of the user in accordance with the detailed shape of the body of the user. In one example, referring to FIG. 6, the first-2 deep-learning model 12 may transform in detail (TPS Transformation) the perspective transformed virtual wearing clothing and the input grid. In one example, the first-2 deep-learning model 12 may be configured with in-depth neural network and include a first-2 property extraction unit and a first-2 transformation parameter estimation unit. The first-2 property extraction unit may include four down sampling convolution layers of 2-stride and 4-kernel size and two convolution layers of 1-stride and 3-kernal size. The first-2 transformation parameter estimation unit may include two down sampling convolution layers of 2-stride and 4-kernel size, two convolution layers of 1-stride and 3-kernal size and a fully connected layer. The first-2 transformation parameter estimation unit may be configured to estimate total fifty parameters of 2*Gsize^2 for detailed transformation when a grid size (Gsize) is 5.

<Training of the First Deep-Learning Model 10>

The first deep-learning model 10 may separately train the first-1 deep-learning model 11. The first-1 deep-learning model 11 may use a first-1 model loss $L_{persp}$ when performing the training. The first-1 model loss $L_{persp}$ is a loss so as to approximate the perspective transformation of the virtual wearing clothing to Truth by comparing the first-1 transformation virtual wearing clothing image $I_{1-1}$ output by the first-1 deep-learning model 11 and the transformation clothing truth image $I_{cp}$ of the training data set. The first-1 model loss $L_{persp}$ may be represented by Equation 1.

$$L_{persp}=\|I_{1-1}-I_{cp}\|_1 \quad \text{(Equation 1)}$$

The first deep-learning model 10 may use a first-2 model loss $L_{warp}$ when performing the training. In this case, in comparison with the first-1 model loss $L_{persp}$, the first-1 model loss $L_{persp}$ is a loss used for training of the first-1 deep-learning model 11, but the first-2 model loss $L_{warp}$ is a reference loss used for training the entire neural network. The first-2 model loss $L_{warp}$ is a loss so as to approximate the transformation to the detailed shape of the body of the user of the virtual wearing clothing by comparing the first-2 transformation virtual wearing clothing image $I_{1-2}$ output by the first-2 deep-learning model 12 and the transformation clothing truth image $I_{cp}$ of the training data set. The first-2 model loss $L_{warp}$ may be represented by Equation 2.

$$L_{warp}=\|I_{1-2}-I_{cp}\|_2 \quad \text{(Equation 2)}$$

In addition, the first deep-learning model 10 may use a grid interval consistency loss $L_{gic}$ when performing the training. The clothing are objects transformable to various shapes, but a transformation of a human body is restrictive. When a person dresses clothing, there is a tendency that a property of clothing is maintained in the body of the person. The detailed transformation (TPS Transformation) by the first-2 deep-learning model may show a good performance generally but generate a distortion in a pattern of clothing and printed matter frequently with high flexibility. In order to prevent the distortion and maintain the property of clothing, the grid interval consistency loss $L_{gic}$ is used. The grid interval consistency loss $L_{gic}$ is based on a distance DT (a, b) between a and b, which are adjacent for each pixel of the virtual wearing clothing image. Understanding this, the grid interval consistency loss $L_{gic}$ may be represented by Equation 3.

$$L_{gic}(\hat{G}_x, \hat{G}_y) = \sum_{y}^{H_G} \sum_{x}^{W_G} \left( DT(\hat{G}_x(x,y), \hat{G}_x(x+1,y)) + DT(\hat{G}_y(x,y), \hat{G}_y(x,y+1)) \right)$$ (Equation 3)

In Equation 3, $\hat{G}_x(x, y)$ is a x coordinate of a grid for mapping, $\hat{G}_x(x, y)$ is a y coordinate of a grid for mapping, $H_G$ is a height of a grid, and $W_G$ is an area of a grid. The consistency of interval as well as the pattern of clothing and printed matter may be maintained by the grid interval consistency loss $L_{gic}$, and the shape properties may be maintained after the transformation of the clothing. FIG. 7 shows examples of a virtual wearing clothing image (In-shop clothes) having a single color or repetitive pattern printing property and an input grid of the virtual wearing clothing image. In the case of training by considering the first-2 model loss $L_{warp}$ only, according to the first deep-learning model 10, a vortex pattern is generated in the first-2 transformation virtual wearing clothing image and the grid (Warping w/o GIC loss), and the property of the clothing is distorted. In the case of training by considering the grid interval consistency loss $L_{gic}$ in addition to the first-2 model loss $L_{warp}$, according to the first deep-learning model 10, the first-2 transformation virtual wearing clothing image and the grid (Warping w/o GIC loss) are transformed in accordance with the body of the user while the property of the clothing is maintained.

Furthermore, in the case of training for the first-2 model loss $L_{warp}$ by using the occlusion processor 14, the first deep-learning model 10 may train except for an occlusion area. The occlusion area may be referred to as a part of the virtual wearing clothing blocked by hair or body of a person. Generally, when a person dresses clothing, the clothing may be blocked by a body part such as hair or an arm. In this case, since the neural network is trying to match the virtual wearing clothing with a clothing area which is not blocked by the body, a deformation of the virtual wearing clothing may occur when dressing the virtual wearing clothing. In order to solve this issue, the occlusion processor 14 may exclude the occlusion area in the first-2 model loss $L_{warp}$ calculation. FIG. 8 shows examples of a virtual wearing clothing image (In-shop clothes) and a person image dressing the virtual wearing clothing (Target Person). The occlusion processor 14 may generate the person image dressing the virtual wearing clothing (Target Person), that is, an occluded clothes image in which clothes segmentation is performed in the transformation clothing truth image $I_{cp}$ and the part of the clothes being occluded is removed. The first deep-learning model 10 may train the first-2 model loss $L_{warp}$ using the occluded clothes image. The clothing transformed without the occlusion process is transformed not in accordance with the body of the person intended to virtually wear (Warping w/o Occlusion Handling). The clothing transformed with the occlusion process is transformed in accordance with the body of the person intended to virtually wear (Warping w/Occlusion Handling).

In addition, the first deep-learning model 10 may use a first adversarial loss $L_{ggan}$ when performing the training. That is, the first deep-learning model 10 may improve a geographical match performance using the GAN concept when performing the training. The limitation of the loss based on strength difference like the first-2 model loss $L_{warp}$ is that it is difficult to distinguish a foreground and a background of a similar color. One example is an image of white colored clothing on a white colored background. In order to solve this issue, the first deep-learning model 10 may use the first discrimination unit 13. The first discrimination unit 13 may be trained based on the GAN loss and the hinge loss. The first discrimination unit 13 may generate a first discrimination image $D(I_{1-2})$ based on the first-2 transformation virtual wearing clothing image $I_{1-2}$. The first adversarial loss $L_{ggan}$ may be represented by Equation 4.

$$L_{ggan}(I_{1-2}) = \text{ReLU}(1.0 - D(I_{1-2}))$$ (Equation 4)

In one example, the first discrimination unit 13 may include four down sampling convolution layers of 2-stride and 3-kernel size, one convolution layer of 1-stride and 3-kernal size and a fully connected layer. In addition, a spectrum normalization may be applied to the layer of the first discrimination unit.

Furthermore, the first deep-learning model 10 may be trained to transform virtual wearing clothing in accordance with a body of a user while the property of the virtual wearing clothing is maintained by using the first deep-learning model loss $L_{gmm}$ to which the loss described above is linearly combined. The first deep-learning model loss $L_{gmm}$ may be represented by Equation 5.

$$L_{gmm} = \lambda_{warp} L_{warp} + \lambda_{gic} L_{gic} + \lambda_{ggan} L_{ggan}$$ (Equation 5)

In Equation 5, $\lambda_{warp}$, $\lambda_{gic}$, and $\lambda_{ggan}$ are hyper parameters. A user may adjust a relative importance of each loss by adjusting the hyper parameters. For example, $\lambda_{earp}$, $\lambda_{gic}$ and $\lambda_{ggan}$ may be set to 1, 1 and 0.1, respectively.

<Technical Effect of Trained First Deep-Learning Model 10>

The first deep-learning model 10 shows better performance when the detailed transformation is performed after the perspective transformation is performed than the case that the detailed transformation is performed. For example, referring to FIG. 9, the first deep-learning model 10 may use a user image and a virtual wearing clothing image as an input. There is a virtual wearing image (TPS only) to which the detailed transformation is performed by the first-2 deep-learning model 12. There is a virtual wearing image (Perspective+TPS) to which the detailed transformation is performed by the first-2 deep-learning model 12 after the perspective transformation by the first-1 deep-learning model 11. It is identified that the latter virtual wearing image shows the shape that the property of clothing is maintained and the shape of more realistic wearing.

In addition, in the case of transforming the virtual wearing clothing in accordance with a body by the grid interval consistency loss, according to the first deep-learning model 10, a pattern of clothing and a printed matter may be preserved without distortion. For instance, referring to FIG. 10, the first deep-learning model 10 may use a user image and a virtual wearing clothing image as an input. The unique property like a pattern of clothing is distorted in the transformed virtual wearing clothing (w/o GIC loss) in which the grid interval consistency loss is not considered, but the unique property like a pattern of clothing is maintained in the transformed virtual wearing clothing (w/GIC loss) in which the grid interval consistency loss is considered.

Furthermore, according to the first deep-learning model 10, the virtual wearing clothing transformed with an occlusion process by the occlusion processor 14 may be more accurately dressed on a body of a user. In one example, referring to FIG. 11, the first deep-learning model 10 may use a user image and a virtual wearing clothing image as an input. The virtual wearing clothing (w/o Occlusion Handling) learned and transformed without the occlusion process is transformed not in accordance with a body of a user. The virtual wearing clothing (w/Occlusion Handling) learned and transformed with the occlusion process is transformed in accordance with a body of a user.

In addition, the first deep-learning model 10 compensates a limitation of the strength based loss function like the first-2 model loss $L_{warp}$ by the first discrimination unit 13. The first adversarial loss $L_{ggan}$ by the first discrimination unit 13 may improve the transformation performance since the first adversarial loss $L_{ggan}$ gives a disadvantage to a wrong transformation result by the first-2 deep-learning model. In one example, referring to FIG. 12, the first deep-learning model 10 may use a user image and a virtual wearing clothing image as an input. The virtual wearing clothing (w/o Discriminator) learned and transformed without the first discrimination unit is transformed not in accordance with a body of a user. The virtual wearing clothing (w/Discriminator) learned and transformed with the first discrimination unit is transformed in accordance with a body of a user.

Furthermore, referring to FIG. 13, the virtual wearing clothing transformation according to the first deep-learning model 10 according to an embodiment of the present disclosure is compared with the virtual wearing clothing transformation according to the conventional art. The transformation result of the virtual wearing clothing according to an embodiment of the present disclosure is LA-VITION GMM, and the result of dressing the transformed clothing on a user (Target Person) is LA-VITION align. The transformation result of the virtual wearing clothing according to the conventional art is VITON SCMM and CP-VTON GMM, and the result of dressing the transformed clothing on a user (Target Person) is SCMM align and CP-VTON align, respectively. The virtual wearing clothing transformation according to an embodiment of the present disclosure may maintain the properties such as a pattern of clothing and a printed matter and is dressed properly on the user, but the conventional art does not.

Figure 14:
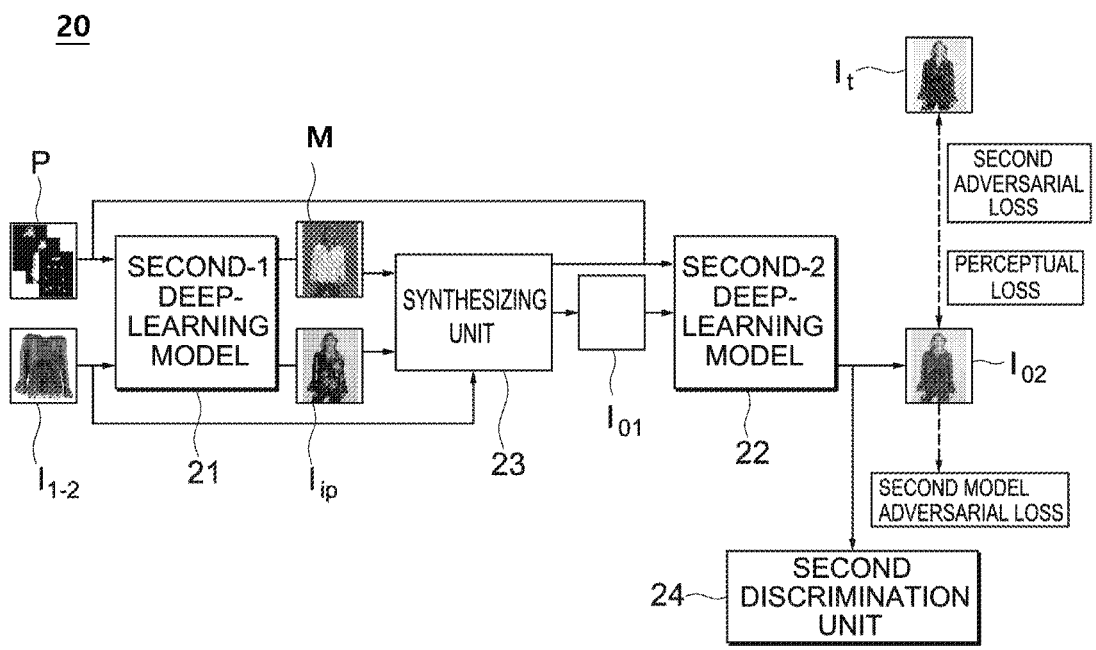
FIG. 14 is a diagram for schematically illustrating a structure of a second deep-learning model of a virtual clothing wearing deep-learning modeling unit according to an embodiment of the present disclosure.
Figure 15:
FIG. 15 illustrates comparison examples of comparing shapes of dressing transformed virtual wearing clothing of a second deep-learning model according to an embodiment of the present disclosure and conventional art.

FIG. 14 is a diagram for schematically illustrating a structure of a second deep-learning model of a virtual clothing wearing deep-learning modeling unit according to an embodiment of the present disclosure, and FIG. 15 illustrates comparison examples of comparing shapes of dressing transformed virtual wearing clothing of a second deep-learning model according to an embodiment of the present disclosure and conventional art.

The second deep-learning model 20 according to an embodiment of the present disclosure may arrange virtual wearing clothing transformed in accordance with a body of a user and dress the virtual wearing clothing virtually. That is, the second deep-learning model 20 may naturally synthesize the virtual wearing clothing transformed by the first deep-learning model 10 with a user in an image to dress virtually. Particularly, the second deep-learning model 20 may make the virtual wearing clothing naturally dressed on the user in accordance with the body of the user by using a synthesis mask image to guide a position of the virtual wearing clothing on the body of the user and an intermediate person image in which an arm or a hand of the user is naturally generated according to a length of the virtual wearing clothing. In addition, the second deep-learning model 20 may improve an image quality and reduce unnaturalness by disposing a second-2 deep-learning model 2-2 which is a refinement layer.

Referring to FIG. 14, the second deep-learning model 20 according to an embodiment of the present disclosure may include a second-1 deep-learning model 21, a synthesizing unit 23, a second-2 deep-learning model 22 and a second discrimination unit 24.

<Generation of a Synthesis Mask and an Intermediate Person of the Second-1 Deep-Learning Model 21>

The second-1 deep-learning model 21 may generate a synthesis mask image M and an intermediate person image $I_{ip}$ based on the user image P and the first-2 transformation virtual wearing clothing image $I_{1-2}$. In the synthesis mask image M, a position in which the first-2 transformation virtual wearing clothing is disposed may be territorialized in the user image P. The intermediate person image $I_{ip}$ may be an image of generating an arm and/or a hand which is a body of the user in accordance with a length of the virtual wearing clothing. In one example, in the case that the length of the virtual wearing clothing is shorter than a length of the clothing that the user dresses in the user image, when the virtual wearing clothing is arranged on the user and dressed, there is a possibility that a part to expose the body of the user may be seen as the clothing dressed before dressing the virtual wearing clothing. In this case, the second-1 deep-learning model 21 may generate the intermediate person image $I_{ip}$ generating an arm and/or a hand to be exposed when dressing the virtual wearing clothing on the user. Furthermore, in one embodiment, the second-1 deep-learning model 21 may include two convolution layers of 2-stride, four dilated convolution layers having different dilation rates, respectively, and two up-sampling layers. In addition, the spectrum normalization layer may be applied to the second-1 deep-learning model 21 to improve the GAN performance.

<Virtual Wearing Clothing Synthesis of the Synthesizing Unit 23>

The synthesizing unit 23 may generate a first virtual wearing person image $I_{o1}$ in which a user virtually dresses the first-2 transformation virtual wearing clothing image $I_{1-2}$ by synthesizing the synthesis mask image M, the intermediate person image $I_{ip}$ and the first-2 transformation virtual wearing clothing image $I_{1-2}$. The synthesizing unit 23 may synthesize it according to Equation 6.

$$I_{o1}=M \otimes I_{1-2}+(1-M)\otimes I_{ip} \qquad \text{(Equation 6)}$$

In Equation 6, $\otimes$ is a factorized matrix multiplication.

<Image Quality Improvement of the Second-2 Deep-Learning Model 22>

The second-2 deep-learning model 22 may generate a second virtual wearing person image $I_{o2}$ for improving an image quality of the first virtual wearing person image $I_{o1}$, removing an artificial factor of virtual wearing and virtually dressing the clothing naturally based on the user image P and the first virtual wearing person image $I_{o1}$. That is, the second-2 deep-learning model 22 may further improve the quality of the first virtual wearing person image $I_{o1}$ which is generated by the second-1 deep-learning model 21 and the synthesizing unit 23. In addition, the second-2 deep-learning model 22 may preserve the original characteristics of the user by using the initially input user image P. In one example, the second-2 deep-learning model 22 may a plurality of dilated convolutions to preserve detailed items of the input image and maintain high resolution property. Furthermore, the spectrum normalization layer may be applied to the second-2 deep-learning model 22 to improve the GAN performance.

<Training of the Scond Deep-Learning Model 20>

The second deep-learning model 20 may use a second model loss $L_{align}$ when performing training. The second model loss $L_{align}$ is a loss so as to approximate dressing the transformed virtual wearing clothing on a body of a user to Truth by comparing the second virtual wearing person image $I_{o2}$ output by the second-2 deep-learning model 22 and the Truth label $I_t$ of the training data set. The second model loss $L_{align}$ may be represented by Equation 7.

$$L_{align} = \|I_{o2} - I_t\|_1 \quad \text{(Equation 7)}$$

In addition, the second deep-learning model 20 may use a perceptual loss $L_{vgg}$ when performing the training. The perceptual loss $L_{vgg}$ may optimize the second virtual wearing person image $I_{o2}$ in a specific space using VGG-19 neural network which is widely known, and further improve an image quality of the second virtual wearing person image $I_{o2}$. The perceptual loss $L_{vgg}$ may be represented by Equation 8.

$$L_{vgg}(I_{o2}, I_t) = \sum_{i=1}^{5} \lambda_i \|\Phi_i(I_{o2}) - \Phi_i(I_t)\| \quad \text{(Equation 8)}$$

In Equation 8, is $\Phi_i(I_{o2})$ the $i^{th}$ layer property map of the VGG-19 neural network for the second virtual wearing person image $I_{o2}$. $\Phi_i(I_t)$ is the $i^{th}$ layer property map of the VGG-19 neural network for the Truth label $I_t$ of the training data set.

Furthermore, the second deep-learning model 20 may use a second adversarial loss $L_{adv}$ when performing the training. In this case, the second deep-learning model 20 may use a Spectral-Normalization GAN (SNGAN). The SNGAN may improve an image quality of the generated second virtual wearing person image $I_{o2}$. The second deep-learning model 20 may perform training in the adversarial method between the second-2 deep-learning model 22 and the second discrimination unit 24. That is, according to the second deep-learning model 20, when the second discrimination unit 24 maximizes a discrimination expectation value $V_D$ of Equation 9, the second-2 deep-learning model 22 minimizes a generation expectation value $V_G$ of Equation 10. Furthermore, the second deep-learning model 20 may apply a hinge loss for further stabilization when applying the SNGAN.

$$v_D = \mathbb{E}_{I_t \sim P_{data}}[\min(0, -1 D(I_t))] + \mathbb{E}_{I_{o2} \sim P_{generated}}[\min(0, -1 - D(I_{o2}))] \quad \text{(Equation 9)}$$

$$V_G = -\mathbb{E}_{I \sim P_{generated}}[D(I_{o2})] \quad \text{(Equation 10)}$$

The second adversarial loss $L_{adv}$ may be represented by Equation 11.

$$L_{adv}(I_{o2}) = \text{ReLU}(-D(I_{o2})) \quad \text{(Equation 11)}$$

In addition, the second deep-learning model 20 may arrange virtual wearing clothing transformed in accordance with a body of a user in an image and dress the virtual wearing clothing virtually using a second deep-learning model loss $L_{TOM}$ in which the loss described above is linearly combined. The second deep-learning model loss $L_{TOM}$ may be represented by Equation 12.

$$L_{TOM} = \lambda_{adv} L_{adv} + \lambda_{align} L_{align} + \lambda_{vgg} L_{vgg} + \lambda_{mask} \|1 - M\|_2 \quad \text{(Equation 12)}$$

In Equation 12, $\lambda_{adv}$, $\lambda_{align}$, $\lambda_{vgg}$ and $\lambda_{mask}$ are hyper parameters. A user may adjust a relative importance of each loss by adjusting the hyper parameters. For example, $\lambda_{adv}$, $\lambda_{align}$, $\lambda_{vgg}$ and $\lambda_{mask}$ may be set to 0.01, 1.0, 1.0 and 1.0, respectively. In addition, in Equation 12, a penalty term for the synthesis mask image M is added for preserving a pixel of the transformed virtual wearing clothing to the maximum.

<Technical Effect of Trained Second Deep-Learning Model 20>

The second deep-learning model 20 may dress the transformed virtual wearing clothing on a user naturally and generate an image of high quality. Referring to FIG. 15, the generation of the virtual wearing clothing dressing image LA-VITON transformed by the second deep-learning model 20 is compared with a result of a generation of the virtual wearing clothing dressing image according to CP-VTON which is the conventional art. First, the virtual wearing clothing (GMM Aligned) for which the virtual wearing clothing (In-shop Clothes) is transformed in accordance with a body of a user (Target Person) to the first deep-learning model 10 is commonly used. In comparing the results of virtually dressing the transformed virtual wearing clothing (GMM Aligned) dressed on the user (Target Person), the second deep-learning model 20 shows the result with more clear color and higher quality of less artificial factors than CP-VTON which is the conventional art and preserves the unique property of a pattern of closing and a printed matter of the virtual wearing clothing.

Figure 16:
FIG. 16 illustrates comparison examples of comparing shapes of dressing transformed virtual wearing clothing of a virtual clothing wearing deep-learning modeling unit according to an embodiment of the present disclosure and the conventional art.

FIG. 16 illustrates comparison examples of comparing shapes of dressing transformed virtual wearing clothing of a virtual clothing wearing deep-learning modeling unit according to an embodiment of the present disclosure and the conventional art.

For quantitative comparison research of the virtual clothing wearing technique according to an embodiment of the present disclosure and the conventional art, 523 virtual dressings are compared. The virtual wearing clothing dressing image LA-VITON according to an embodiment of the present disclosure and the virtual wearing clothing dressing image CP-VTON according to the conventional art are provided to 10 experimenters, and the 10 experimenters are requested to select preferable and realistic virtual wearing result. As a result, the experimenters select the virtual wearing clothing dressing image LA-VITON according to an embodiment of the present disclosure with the preference of 78.8% and selects the virtual wearing clothing dressing image CP-VTON according to the conventional art with the preference of 21.22%.

FIG. 16 shows a qualitive comparison between the virtual clothing wearing technique and the conventional art. There are virtual wearing clothing (In-shop Clothes) and users (Target Persons) to dress the virtual wearing clothing. The conventional art is VITON and CP-VTON technique. In comparing the results of dressing the virtual wearing clothing (In-shop Clothes) on the users (Target Persons), the image (VITON) of the virtual wearing shape according to VITON and the image (CP-VTON) of the virtual wearing shape according to CP-VTON hardly maintain the properties of a pattern and printed matter of the virtual wearing clothing (In-shop Clothes) before virtual wearing. However, the image (LA-VITON) of the virtual wearing shape according to an embodiment of the present disclosure maintains the properties of a pattern and a printed matter of the virtual wearing clothing (In-shop Clothes) before virtual wearing.

Therefore, an apparatus for providing virtual clothing wearing service based on deep-learning according to an embodiment of the present disclosure may provide a shape of wearing image clothing virtually on an image user by using deep-learning neural network. Furthermore, an apparatus for providing virtual clothing wearing service based on deep-learning according to an embodiment of the present disclosure may dress image clothing on a body of a user. Furthermore, some embodiments of the present disclosure providing an apparatus for providing virtual clothing wearing service based on deep-learning dress image clothing on a posture of a user in a user image. Furthermore, certain embodiments of the present disclosure may provide an apparatus for providing virtual clothing wearing service based on deep-learning clothing on a user while maintaining unique properties of the clothing such as a design, a pattern, a printing of the clothing. Furthermore, according to some embodiments of the present disclosure providing an apparatus for providing virtual clothing wearing service based on deep-learning, the learning may be easily performed even in the case that clothing are similar to a background. Furthermore, certain embodiments of the present disclosure providing an apparatus for providing virtual clothing wearing service based on deep-learning may dress clothing even in the case that the clothing are blocked by hair or body of a user.

Figure 17:
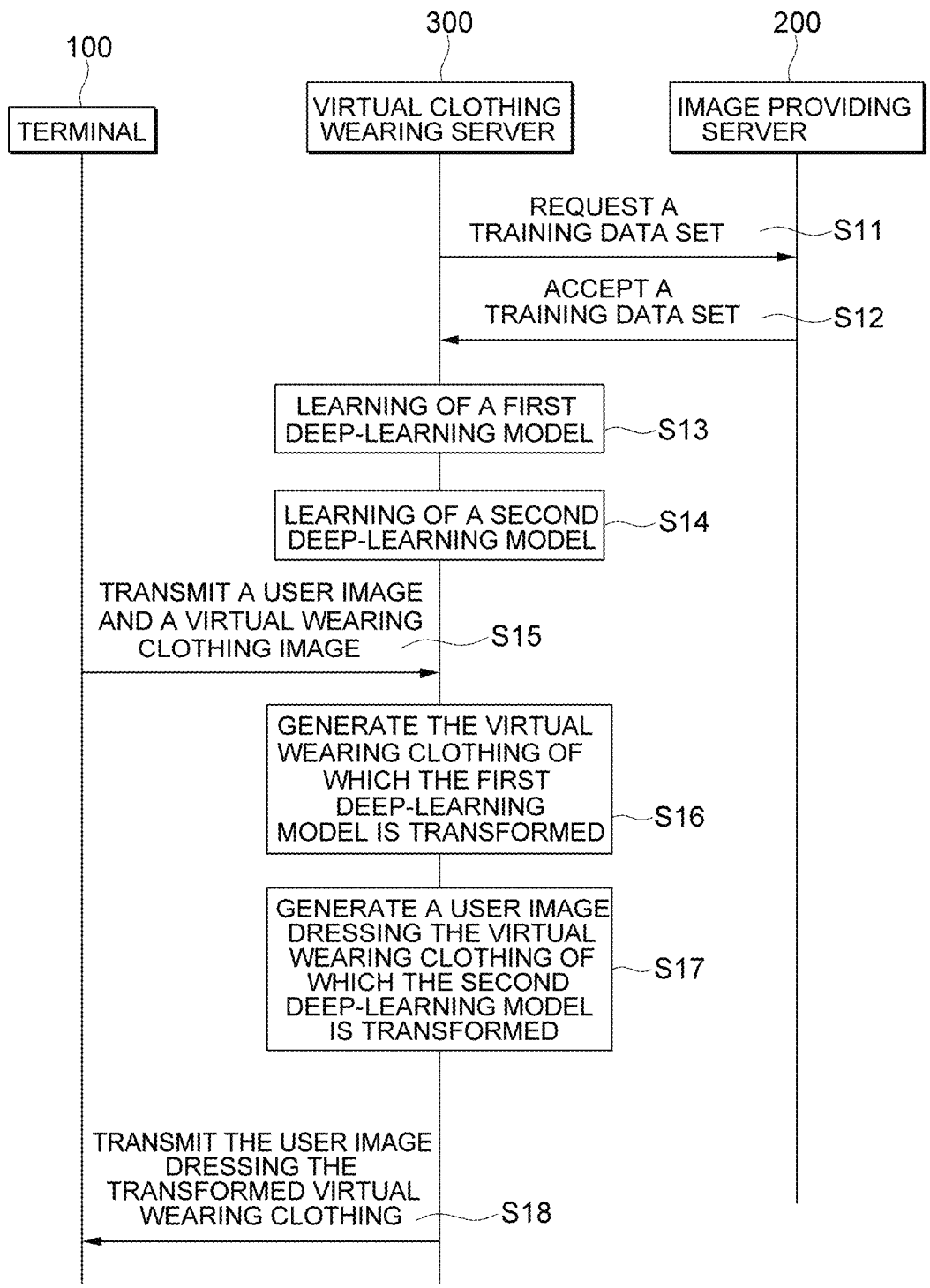
FIG. 17 is a signal flowchart of a virtual clothing wearing service system based on deep-learning according to an embodiment of the present disclosure.

FIG. 17 is a signal flowchart of a virtual clothing wearing service system based on deep-learning according to an embodiment of the present disclosure.

Referring to FIG. 17, the virtual clothing wearing server 300 may request a training data set to the image providing server 200 (step S11). The image providing server 200 may transmit the training data set to the virtual clothing wearing server 300 (step S12). The virtual clothing wearing server 300 may perform learning of a first deep-learning model based on the received training data set (step S13). The virtual clothing wearing server 300 may perform learning of a second deep-learning model based on the received training data set (step S14). The terminal 100 may transmit a user image and a virtual wearing clothing image to the virtual clothing wearing server 300 (step S15). The transmission of the user image and the virtual wearing clothing image by the terminal 100 may mean a request for the virtual clothing wearing service to the virtual clothing wearing server 300. The virtual clothing wearing server 300 may generate the virtual wearing clothing of which the first deep-learning model is transformed based on the user image and the virtual wearing clothing image (step S16). The virtual clothing wearing server 300 may generate a user image dressing the virtual wearing clothing of which the second deep-learning model is transformed (step S17). The virtual clothing wearing server 300 transmits the user image dressing the transformed virtual wearing clothing to the terminal 100 (step S18).

Figure 18:
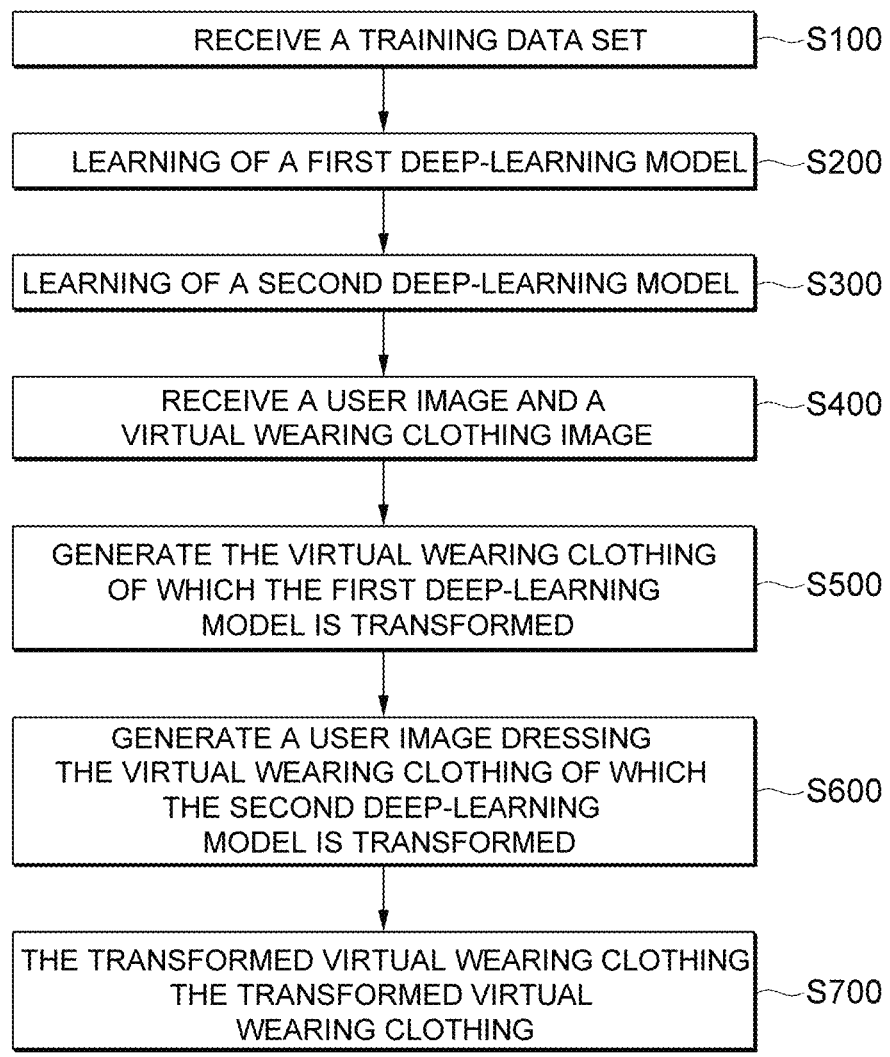
FIG. 18 is a flowchart for illustrating a method for providing a virtual clothing wearing service based on deep-learning according to an embodiment of the present disclosure.
Figure 19:
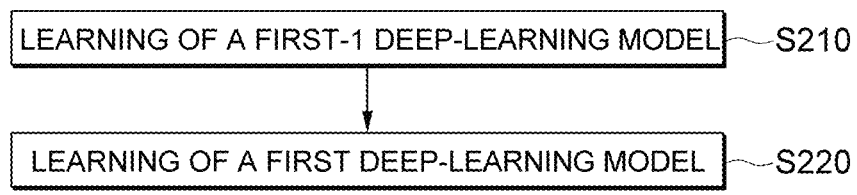
FIG. 19 is a flowchart for illustrating a method for learning a first deep-learning model of FIG. 18.

FIG. 18 is a flowchart for illustrating a method for providing a virtual clothing wearing service based on deep-learning according to an embodiment of the present disclosure, and FIG. 19 is a flowchart for illustrating a method for learning a first deep-learning model of FIG. 18. FIG. 20 is a flowchart for illustrating a method for learning a second deep-learning model of FIG. 18, and FIG. 21 is a flowchart for illustrating a method for generating the virtual wearing clothing of which the first deep-learning model is transformed. FIG. 22 is a flowchart for illustrating a method for generating the virtual wearing clothing of which the second deep-learning model is transformed.

Referring to FIG. 18, a method for providing a virtual clothing wearing service based on deep-learning according to an embodiment of the present disclosure may include a step S100 of receiving, by the virtual clothing wearing server 300, a training data set from the image providing server 200.

The method for providing a virtual clothing wearing service based on deep-learning according to an embodiment of the present disclosure may include a step S200 of learning, by the virtual clothing wearing server 300, the first deep-learning model 10 of the virtual clothing wearing deep-learning modeling unit 1. For example, referring to FIG. 19, the step S200 of learning the first deep-learning model 10 may include a step S210 of learning a first-1 deep-learning model. The step S210 of learning the first-1 deep-learning model may be a step of training only the first-1 deep-learning model separately among the first deep-learning models 10 using the first-1 model loss $L_{persp}$. The detailed description for learning of the first-1 deep-learning model is based on the training description of the first deep-learning models 10 described above. The step S200 of learning the first deep-learning models 10 may include a step S220 of learning the first deep-learning model. The step S220 of learning a first deep-learning model may be a step of learning the entire first deep-learning model including the first-1 deep-learning model using the first deep-learning model loss $L_{gmm}$ after learning the first-1 deep-learning model in step S210. The step of learning the entire first deep-learning model including the first-1 deep-learning model after learning the first-1 deep-learning model is based on the training description of the first deep-learning models 10 described above.

The method for providing a virtual clothing wearing service based on deep-learning according to an embodiment of the present disclosure may include a step S300 of learning, by the virtual clothing wearing server 300, the second deep-learning model 20 of the virtual clothing wearing deep-learning modeling unit 1. For example, referring to FIG. 20, the step S300 of learning the second deep-learning model 20 may include a step S310 of learning the second-1 deep-learning model and the second-2 deep-learning model. The step S310 of learning the second-1 deep-learning model and the second-2 deep-learning model may be a step of learning the entire second deep-learning model using the second deep-learning model loss $L_{TOM}$. The step of learning the entire second deep-learning model may be based on the training description of the second deep-learning models 20 described above.

The method for providing a virtual clothing wearing service based on deep-learning according to an embodiment of the present disclosure may include a step S400 of receiving, by the virtual clothing wearing server 300, a user image and a virtual wearing clothing image from the terminal 100.

The method for providing a virtual clothing wearing service based on deep-learning according to an embodiment of the present disclosure may include a step S500 of generating the virtual wearing clothing of which the first deep-learning model 10 of the virtual clothing wearing server 300 is transformed. For example, referring to FIG. 21, the step S500 of generating the transformed virtual wearing clothing may include a step S510 of generating a first-1 transformation virtual wearing clothing image by performing the Perspective Transformation of virtual wearing clothing in accordance with a direction of a body of a user based on the user image and the virtual wearing clothing image by the first deep-learning model 10. The method of generating the first-1 transformation virtual wearing clothing image is based on the description of the Perspective Transformation of the first-1 deep-learning model 11. In addition, the step S500 of generating the transformed virtual wearing clothing may include a step S520 of generating a first-2 transformation virtual wearing clothing image which is a finally transformed virtual wearing clothing by transforming in detail of the first-1 transformation virtual wearing clothing image in accordance with a detailed shape of the body of the user by the first deep-learning model 10. The method of generating the first-2 transformation virtual wearing clothing image is based on the description of the detailed transformation of the first-2 deep-learning model 12.

The method for providing a virtual clothing wearing service based on deep-learning according to an embodiment of the present disclosure may include a step S600 of generating a user image dressing the virtual wearing clothing of which the second deep-learning model 10 of the virtual clothing wearing server 300 is transformed. For example, referring to FIG. 22, the step S600 of generating the user image dressing the transformed virtual wearing clothing may include a step S610 of generating, by the second-1 deep-learning model 21, a synthesis mask image and an intermediate person image based on the user image and the first-1 transformation virtual wearing clothing image. The step S610 of generating the synthesis mask image and the intermediate person image is based on the description of the synthesis mask and the intermediate person generation of the second-1 deep-learning model 21 described above. In addition, the step S600 of generating the user image dressing the transformed virtual wearing clothing may include a step S620 of generating the first virtual wearing person image by synthesizing the first-2 transformation virtual wearing clothing image, the intermediate person image and the synthesis mask image by the synthesizing unit 23. The step S620 of generating the first virtual wearing person image is based on the description for the virtual wearing clothing synthesis of the synthesizing unit 23 described above. Furthermore, the step S600 of generating the user image dressing the transformed virtual wearing clothing may include a step S630 of generating the second virtual wearing person image using the user image and the first virtual wearing person image by the second-2 deep-learning model 22. The step S630 of generating the second virtual wearing person image is based on the description of image quality improvement of the second-2 deep-learning model 22 described above.

In addition, the method for providing a virtual clothing wearing service based on deep-learning according to an embodiment of the present disclosure may include a step S700 of transmitting, by the virtual clothing wearing server 300, the second virtual wearing person image which is a user image dressing the transformed virtual wearing clothing to the terminal 100.

A method and apparatus for providing virtual clothing wearing service based on deep-learning according to an embodiment of the present disclosure may provide a shape of wearing image clothing virtually on an image user by using deep-learning neural network.

Furthermore, a method for providing virtual clothing wearing service based on deep-learning according to an embodiment of the present disclosure may automatically dress image clothing on a body of a user. Furthermore, some embodiments of the present disclosure providing a method for providing virtual clothing wearing service based on deep-learning may dress image clothing on a posture of a user. Furthermore, certain embodiments of the present disclosure providing a method for providing virtual clothing wearing service based on deep-learning may dress image clothing on a user while maintaining unique properties of the clothing such as a design, a pattern, a printing of the clothing. Furthermore, according to some embodiments of the present disclosure providing a method for providing virtual clothing wearing service based on deep-learning, learning is easily performed even in the case that clothing is similar to a background. Furthermore, the certain embodiment s of the present disclosure providing a method for providing virtual clothing wearing service based on deep-learning may dress clothing even in the case that the clothing are blocked by hair or body of a user.

The embodiment according to the present disclosure described so far may be implemented in a form of program commands to be executed by various computer elements and recorded in a storage medium which is readable by a computer. The storage medium readable by a computer may include program commands, data files, data structures, and the like separately or in combined manner. The program commands recorded in the storage medium readable by a computer may be designed specifically for the present disclosure or published and usable by a skilled person in the art of a computer software field. An example of the storage medium readable by a computer may include a magnetic medium including a hard disk, a floppy disk and a magnetic tape, an optical recording medium like CD-ROM and DVD, a magneto-optical medium like a floptical disk, and a hardware device specifically configured to store and execute program commands such as ROM, RAM, flash memory, and the like. An example of program commands include a high level language executable by a computer using an interpreter as well as a machine language such as those made by a compiler. The hardware device may be modified by one or more software modules to perform a process according to the present disclosure, and vice versa.

The specific executions described in the present disclosure are embodiments but does not limit the scope of the present disclosure in any way. For the conciseness of the specification, the conventional electronic elements, control systems, software and description of other functional aspects of the systems may be omitted. Furthermore, connection lines or connection elements between elements shown in the drawing illustrate exemplary functional connection and/or physical or circuit connections, but may be represented by various functional connections, physical connections or circuit connections which are replaceable or additional. In addition, unless there are detailed mentions such as "essential" or "important", the element may not be an essential element for operation of the present disclosure.

Although the description of the present disclosure has been described with reference to a preferred embodiment, but it will be appreciated by those skilled in the art to which the present disclosure pertains that various modifications and changes may be made from the above description within the range of the concept and technical area of the present disclosure written in the claims. Accordingly, the technical scope of the present disclosure is not limited by the contents described in the specification but determined by the claims.

What is claimed is:

1. A server for generating a virtual clothing wearing image based on deep-learning, comprising:
 a communicator configured to receive a user image and a clothing image for virtual wearing;

a memory configured to store a virtual clothing wearing deep-learning model including a first deep-learning model and a second deep-learning model;

a processor configured to generate a virtual wearing image of virtually dressing a cloth, included the clothing image, on a user, included in the user image, using the virtual clothing wearing deep-learning model, wherein the processor is configured to:

generate, by the first deep-learning model, an image of a transformed virtual wearing clothing by transforming the received clothing image in accordance with a body of the user included in the received user image, and generate, by the second deep-learning model, the virtual wearing image by dressing the transformed virtual wearing clothing, generated by the first deep-learning model, on the body of the user of the received user image, wherein the first deep-learning model includes a first-1 deep-learning model and a first-2 deep-learning model, wherein the first-1 deep-learning model is configured to generate a first-1 transformation virtual wearing clothing image by performing Perspective Transformation to the received clothing image to match with a direction of the body of the user included in the received user image, wherein the first-2 deep-learning model is configured to generate an image of first-2 transformation virtual wearing clothing by transforming the first-1 transformation virtual wearing clothing, included in the image of the first-1 transformation virtual wearing clothing, to be matched with a shape of the body of the user included in the received user image, wherein the first-1 deep-learning model reflects a loss function in neural network learning such that properties including one or more of a design, a pattern, and a printing of the transformed virtual wearing clothing are not transformed but maintained, and obtains a result of similar properties of actual wearing clothing, and wherein, in a case that there is a component including hair and/or body of the user on a body part of a user image in which the transformed virtual wearing clothing is dressed on the user, the first-2 deep-learning model uses an occlusion process and dresses the transformed virtual wearing clothing on the body of the user of the image by excluding the component.

2. The virtual clothing wearing server based on the deep-learning of claim 1, wherein the second deep-learning model includes a second-1 deep-learning model configured to generate a synthesis mask image and an intermediate person image based on the image of first-2 transformation virtual wearing clothing and the received user image, and wherein the second deep-learning model is configured to generate a first virtual wearing person image by synthesizing the synthesis mask image, the intermediate person image and the image of first-2 transformation virtual wearing clothing.

3. The virtual clothing wearing server based on the deep-learning of claim 2, wherein the synthesis mask image is an image that a position of the first-2 transformation virtual wearing clothing is territorialized on the received user image, and wherein the intermediate person image is an image of an arm and/or a hand of the body of the user which is generated based on a length of the first-2 transformation virtual wearing clothing.

4. The virtual clothing wearing server based on the deep-learning of claim 3, wherein the second deep-learning model further includes a second-2 deep-learning model configured to generate a second virtual wearing person image which is generated by a plurality of dilated convolutions and based on the user image and the first virtual wearing person image.

5. The virtual clothing wearing server based on the deep-learning of claim 4, wherein the communicator is configured to receive a training data set including a person, a cloth for virtual wearing, a transformation clothing truth image when wearing, and a Truth Label for the person dressing the cloth for virtual wearing.

6. The virtual clothing wearing server based on the deep-learning of claim 5, wherein the processor is configured to:

perform training of the first-1 deep-learning model using a first-1 model loss of comparing the first-1 transformation virtual wearing clothing image generated by the first-1 deep-learning model and the transformation clothing truth image when virtually wearing for the person and the cloth for virtual wearing of the training data set, and perform training of the first deep-learning model using a first-2 model loss of comparing the image of the first-2 transformation virtual wearing clothing generated by the first-2 deep-learning model and the transformation clothing truth image when virtually wearing for the person and the cloth for virtual wearing of the training data set, when training the first-1 deep-learning model.

7. The virtual clothing wearing server based on the deep-learning of claim 5, wherein the processor is configured to perform training of the first deep-learning model using a grid interval consistency loss based on a distance between pixels of an image of the cloth for virtual wearing.

8. The virtual clothing wearing server based on the deep-learning of claim 7, wherein the processor is configured to generate an occlusion clothing image on which an occlusion part is removed from the transformation clothing truth image through an occlusion process, and wherein the first deep-learning model is configured to use the occlusion clothing image when training using the first-2 model loss.

9. The virtual clothing wearing server based on the deep-learning of claim 7, wherein the processor is configured to:

generate a first discrimination image based on the image of the first-2 transformation virtual wearing clothing, and perform training of the first deep-learning model using a first adversarial loss based on the first discrimination image.

10. The virtual clothing wearing server based on the deep-learning of claim 9, wherein the processor is configured to generate a second virtual wearing person image by the second-2 deep-learning model using the image of first-2 transformation virtual wearing clothing generated by the first-2 deep-learning model for the person and the cloth for virtual wearing of the training data set.

11. The virtual clothing wearing server based on the deep-learning of claim 10, wherein the processor is configured to perform training of the second deep-learning model using the second model loss by comparing the second virtual wearing person image for the person and the cloth for virtual wearing of the training data set and the Truth Label for the person dressing the cloth for virtual wearing.

12. The virtual clothing wearing server based on the deep-learning of claim 11,
wherein the memory further includes a neural network, and
wherein the processor is configured to generate a layer property map for the second virtual wearing person image for the person and the cloth for virtual wearing of the training data set and a layer property map for the Truth Label for the person dressing the cloth for virtual wearing.

13. The virtual clothing wearing server based on the deep-learning of claim 12, wherein the processor is configured to perform training of the second deep-learning model using a perceptual loss by comparing the layer property map for the second virtual wearing person image for the person and the cloth for virtual wearing of the training data set and the layer property map for the Truth Label for the person dressing the cloth for virtual wearing.

14. The virtual clothing wearing server based on the deep-learning of claim 13, wherein the processor is configured to:
generate a second discrimination image based on the second virtual wearing person image through the second deep-learning model, and
perform training using a second adversarial loss based on the second discrimination image.

15. A terminal, comprising:
a communicator configured to transmit a user image and a clothing image for virtual wearing;
at least one processor configured to provide a virtual wearing image of virtually dressing a cloth, included in the clothing image, to a user, included in the user image, using a virtual clothing wearing service request program; and
a memory configured to store the virtual clothing wearing service request program that, if executed by the at least one processor, configure the at least one processor to:
select the user image and the clothing image for virtual wearing,
transmit the selected user image and the selected clothing image using the communicator, and
receive a virtual wearing person image generated by a virtual clothing wearing server based on deep-learning through the communicator,
wherein the virtual clothing wearing server based on the deep-learning includes a first deep-learning model and a second deep-learning model, the first deep-learning model is configured to generate an image of a transformed virtual wearing clothing by transforming the clothing image in accordance with a body of the user included in the user image, and the second deep-learning model is configured to generate the virtual wearing person image by dressing the transformed virtual wearing clothing, generated by the first deep-learning model, on the body of the user included in the user image,
wherein the first deep-learning model includes a first-1 deep-learning model and a first-2 deep-learning model,
wherein the first-1 deep-learning model is configured to generate a first-1 transformation virtual wearing clothing image by performing Perspective Transformation to the received clothing image to match with a direction of the body of the user included in the received user image,
wherein the first-2 deep-learning model is configured to generate an image of first-2 transformation virtual wearing clothing by transforming the first-1 transformation virtual wearing clothing, included in the image of the first-1 transformation virtual wearing clothing, to be matched with a shape of the bod of the user included in the received user image,
wherein the first-1 deep-learning model reflects a loss function in neural network learning such that properties including one or more of a design, a pattern, and a printing of the transformed virtual wearing clothing are not transformed but maintained, and obtains a result similar properties of actual wearing clothing, and
wherein, in a case that there is a component including hair and/or bod of the user on a body part of a user image in which the transformed virtual wearing clothing is dressed on the user, the first-2 deep-learning model uses an occlusion process and dresses the transformed virtual wearing clothing on the body of the user of the image by excluding the component.

16. A method for providing a virtual clothing wearing service by a virtual clothing wearing server based on deep-learning, the method comprising:
obtaining a user image and a clothing image for virtual wearing;
inputting the user image and the clothing image to a first deep-learning model;
outputting, by the first deep-learning model, an image of a transformed virtual wearing clothing which is transformed in accordance with a body of the user included in the user image by the first deep-learning model;
inputting the user image and the image of the transformed virtual wearing clothing to the second deep-learning model; and
outputting, by the second deep-learning model, a virtual wearing person image by dressing the transformed virtual wearing clothing, outputted by the first deep-learning model, on the body of the user included in the user image,
wherein the outputting, by the first deep-learning model, of the image of the transformed virtual wearing clothing includes:
generating, by a first-1 deep-learning model, a first-1 transformation virtual wearing clothing image by performing Perspective Transformation to the clothing image to match with a direction of the body of the user included in the user image, and
generating by a first-2 deep-learning model, a first-2 transformation virtual wearing clothing image by transforming the first-1 transformation virtual wearing clothing, included in the image of the first-1 transformation virtual wearing clothing, to be matched with a shape of the body of the user included in the obtained user image,
wherein the first-1 deep-learning model reflects a loss function in neural network learning such that properties including one or more of a design, a pattern, and a printing of the transformed virtual wearing clothing are not transformed but maintained, and obtains a result of similar properties of actual wearing clothing, and
wherein, in a case that there is a component including hair and/or body of the user on a body part of a user image in which the transformed virtual wearing clothing is dressed on the user, the first-2 deep-learning model uses an occlusion process and dresses the transformed virtual wearing clothing on the body of the user of the image by excluding the component.

17. The method for providing the virtual clothing wearing service by the virtual clothing wearing server based on the deep-learning of claim 16, further comprising transmitting the virtual wearing image, outputted by the second deep-learning model, to a terminal of the user.

* * * * *